(12) United States Patent
Baruch

(10) Patent No.: US 8,453,982 B2
(45) Date of Patent: Jun. 4, 2013

(54) UTILITY CORNER SHELF BRACKET

(75) Inventor: Erez Baruch, Rehovot (IL)

(73) Assignee: Microdel Ltd., Moshav Mashen (IL)

( * ) Notice: Subject to any disclaimer, the term of this patent is extended or adjusted under 35 U.S.C. 154(b) by 143 days.

(21) Appl. No.: 13/074,032

(22) Filed: Mar. 29, 2011

(65) Prior Publication Data

US 2011/0168859 A1  Jul. 14, 2011

Related U.S. Application Data

(63) Continuation-in-part of application No. PCT/IL2009/001061, filed on Nov. 12, 2009.

(60) Provisional application No. 61/117,251, filed on Nov. 24, 2008, provisional application No. 61/218,948, filed on Jun. 21, 2009.

(51) Int. Cl.
*A47B 96/06* (2006.01)
*A47B 13/00* (2006.01)
*A47B 91/00* (2006.01)
*A47G 29/02* (2006.01)

(52) U.S. Cl.
USPC ............... 248/220.1; 248/250; 108/147.11; 108/153.1; 108/157.1

(58) Field of Classification Search
USPC .......... 248/220.1, 250, 247, 300, 220.22, 248/222.14, 222.51; 108/42, 106, 107, 152, 108/147.11, 147.14, 147.17, 154, 156, 153.1, 108/157.1, 158, 158.11, 158.12, 158.13; 211/90.01, 134, 135, 186, 187, 105.2–105.6
See application file for complete search history.

(56) References Cited

U.S. PATENT DOCUMENTS

| | | | |
|---|---|---|---|
| 150,230 A | 4/1874 | Brayton | |
| 975,619 A | 11/1910 | Hollander | |
| 1,159,813 A * | 11/1915 | Volkhardt | 211/104 |
| 1,286,588 A * | 12/1918 | Goodykoontz | 108/28 |
| 1,325,143 A * | 12/1919 | Conterio | 108/42 |
| 2,465,635 A * | 3/1949 | Conterio | 108/42 |
| 2,953,145 A * | 9/1960 | Moss et al. | 135/98 |
| 3,572,787 A | 3/1971 | Timmerman et al. | |
| 3,851,600 A * | 12/1974 | Kohl | 108/147.14 |
| 3,981,250 A * | 9/1976 | Anthony | 108/106 |
| 4,205,815 A | 6/1980 | Sauer et al. | |
| 4,555,082 A | 11/1985 | Sack et al. | |
| 5,154,384 A * | 10/1992 | Owens | 248/220.1 |
| 6,158,360 A | 12/2000 | Cheng | |
| 8,215,246 B2 * | 7/2012 | Quam et al. | 108/156 |

* cited by examiner

*Primary Examiner* — Tan Le
(74) *Attorney, Agent, or Firm* — Law Office of Joseph L. Felber

(57) ABSTRACT

A utility corner shelf bracket which enables easy installation and removal, which are done quickly and without requiring tools, of a utility corner shelf bracket, and placing a shelf upon it, and which it based on bows which are capable of bending on one plane and durable to loads perpendicular to this plane and a tensioning system which enables adjustment to the wall corner prior to installation and fastening to the wall during installation.

3 Claims, 15 Drawing Sheets

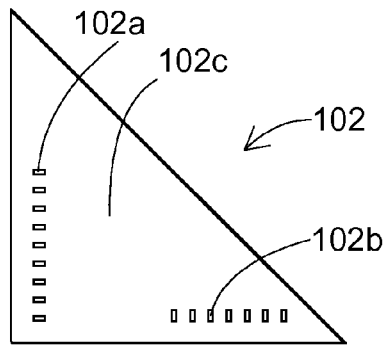
Fig. 16d
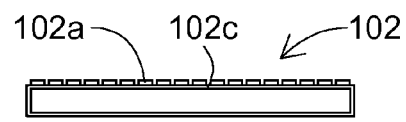
Fig. 16e
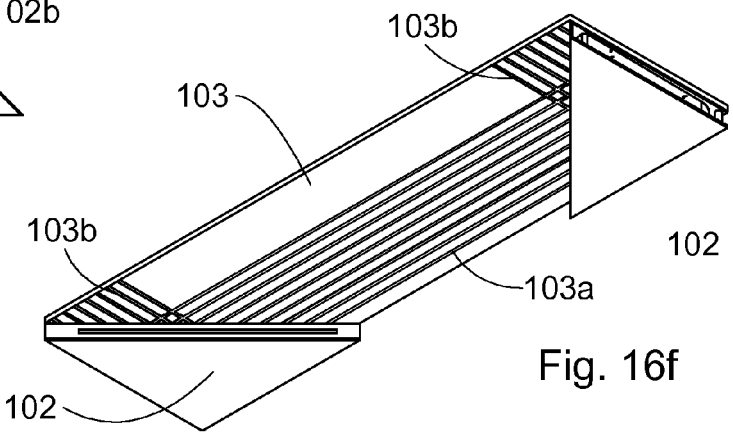
Fig. 16f
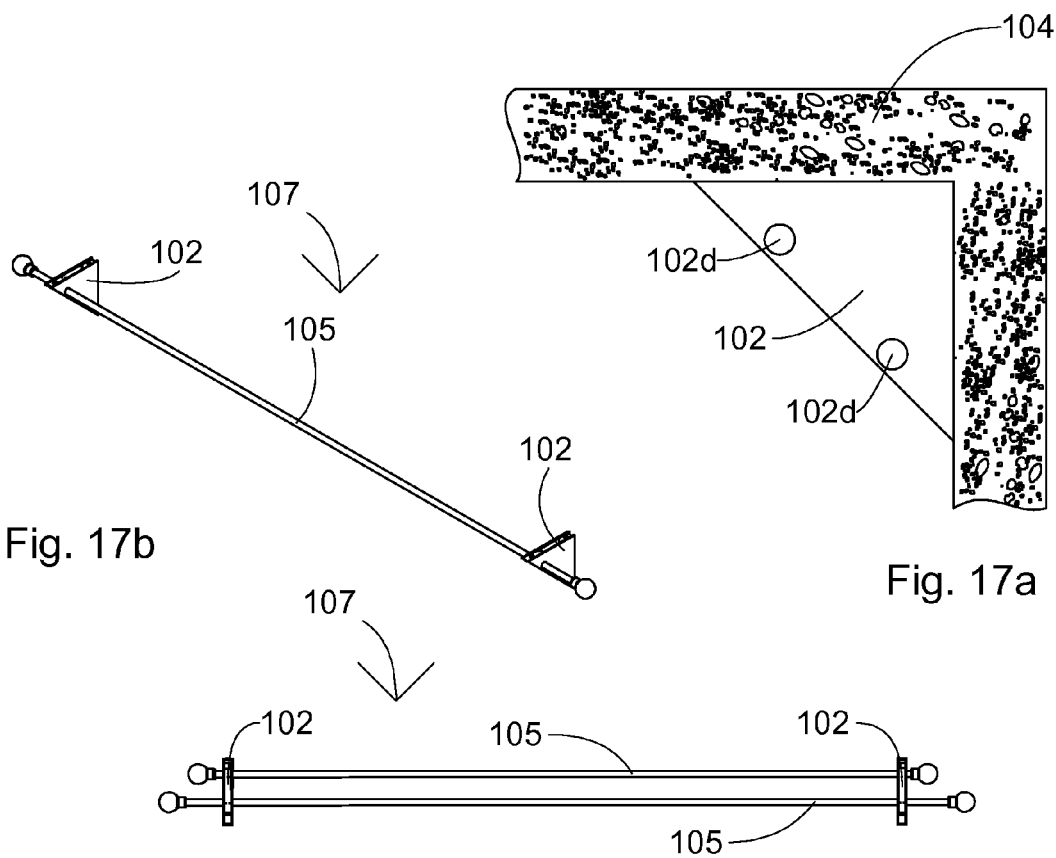
Fig. 17a
Fig. 17b
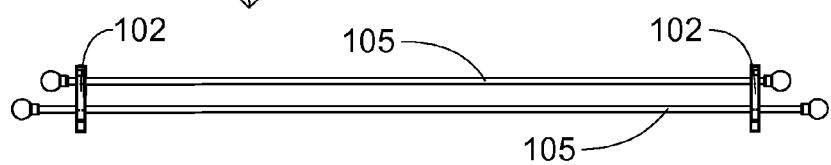
Fig. 17c

UTILITY CORNER SHELF BRACKET

REFERENCE TO CROSS-RELATED APPLICATION

This application is a Continuation-in-Part of PCT/IL2009/001061, filed Nov. 12, 2009.

This application claims priority benefits from PCT/IL2009/001061, filed Nov. 12, 2009, which claims priority benefits from U.S. Provisional Application No. 61/117,251, Filed on Nov. 24, 2008, and from U.S. Provisional Application 61/218,948, filed on Jun. 21, 2009, the full disclosures of which are incorporated herein by reference.

FIELD OF THE INVENTION

The present invention relates to a shelf bracket, and, more particularly, to a utility corner shelf bracket.

BACKGROUND OF THE INVENTION

The need for installing shelves at intersections of structure walls or ends of furniture, which form corners, has existed for many generations. Many solutions are based on placing a shelf on a bracket, which has been fixed to the corner walls at the desired height.

A corner bracket is described in U.S. Pat. No. 1,325,143 (1919) of Conterio, which is incorporated by reference for all purposes as if fully set forth herein.

A shelf assembly and a support bracket are described in U.S. Pat. No. 4,555,082 (1985) of Sack, et al. which is incorporated by reference for all purposes as if fully set forth herein. This solution is supposed to overcome the limitations of previous solutions, including that of Conterio. These limitations also include being assembled of many separate components, whose assembly is expensive and time consuming, while also being aesthetically unpleasant to the sight.

However, even the solution of Sack, et al. has its faults, particularly the need for mounting means, such as nails or screws that are partially inserted into a pair of walls that form a corner before the installment of the shelf assembly.

None of the prior art devices enable easy installment and removal, which are done quickly and without requiring tools, of a utility corner shelf bracket, upon which a corner shelf is mounted.

There is therefore a need for a utility corner shelf bracket which enables easy installation and removal, which are done quickly and without requiring tools, and upon which a shelf can be mounted, and it would be advantageous if additional accessories could be engaged, for the purpose of bearing loads.

SUMMARY OF THE INVENTION

An embodiment of the present invention is described herein below in which a utility corner shelf bracket can be easily installed and removed, quickly and without requiring tools, and a shelf can be mounted upon it. The utility corner shelf bracket according to the present invention is composed of two external arced elastic bows and an internal arced elastic bow. Upon the external surface of one of the external elastic bows are insertion means and pulling means. Installation of the utility corner shelf bracket according to the present invention is an extremely simple process which includes manual tensioning, similar to tensioning a bow prior to shooting an arrow, placing it where it should be in the corner, releasing the manual tension, and applying pulling force between the bows with the pulling means, causing the insertion means to be inserted into the walls. Afterwards, all that remains to be done is to place a corner shelf on the utility corner shelf bracket. Removal is done by performing similar actions in reverse order. These actions can be performed in a matter of seconds.

According to the present invention there is provided a utility corner shelf bracket including: (a) a first bow, the first bow including: (i) two first bow wings; and (ii) a first bow arc, wherein each one of the first bow wings is operatively connected to the first bow arc; (b) at least one nail operatively connected to each one of the first bow wings.

According to the present invention the utility corner shelf bracket further includes: (c) a second bow operatively connected to the first bow; and (d) a pulling assembly, having a length, operatively connected to the second bow, wherein an operation of the pulling assembly creates a pulling force on the second bow, and wherein the second bow applies force to the two first bow wings.

According to another feature of the present invention the pulling assembly includes: (i) a turnbuckle sleeve; (ii) a central rod, having two ends, wherein one of the ends of the central rod is disposed on the second bow, and wherein one of the ends of the central rod is engaged with the turnbuckle sleeve; and (iii) a screwing rod having two ends wherein one end of the screwing rod is engaged with the turnbuckle sleeve.

According to still another feature of the present invention the utility corner shelf bracket further includes: (e) a T rod disposed on the screwing rod; and (f) two side rods wherein each one of the side rods is disposed on the T rod, and wherein rotation of the turnbuckle sleeve changes the length of the pulling assembly.

According to still another feature of the present invention the utility corner shelf bracket further includes: (g) two first bow extenders, each one of the two first bow extenders, is disposed on the first bow; and (h) two strengthening ribs each one of the two strengthening ribs is disposed on a different one of the first bow wings.

According to the present invention there is provided a utility corner shelf bracket including: (a) a first bow, the first bow including: (i) two first bow wings; and (ii) a first bow arc, wherein each one of the first bow wings is operatively connected to the first bow arc; (b) at least one nail operatively connected to each one of the first bow wings; (c) two pressing handles, wherein each one of the pressing handles is disposed on one of the first bow wings; and (d) a second bow having two ends, wherein each one of the ends of the second bow is disposed on an element of the utility corner shelf bracket selected from a group consisting of a first bow wing, and a pressing handle, wherein the first bow further includes: (ii) a first bow arc, wherein each one of the first bow wings is operatively connected to the first bow arc.

According to another feature of the present invention the utility corner shelf bracket further includes: (e) at least one strengthening rib disposed on one of the first bow wings; and (f) at least one hanging device disposed on the second bow, wherein the first bow arc and the second bow are springs, wherein in a free state the first bow arc has a bow arc bending angle of at most ninety degrees and wherein the second bow has bending angle of at least forty degrees.

According to still another feature of the present invention the utility corner shelf bracket is a one-piece device.

According to still another feature of the present invention the utility corner shelf bracket is made of a polymer.

According to still another feature of the present invention the utility corner shelf bracket includes no connection means.

According to still another feature of the present invention the utility corner shelf bracket further includes: (c) two second bow extenders, wherein each one of the two second bow extenders is disposed on one of the first bow wings; and (d) two pressing handles wherein each one of the pressing handles is disposed on one of the second bow extenders.

According to still another feature of the present invention the utility corner shelf bracket further includes: (e) two first bow extenders, wherein each one of the first bow extenders, is disposed on one of the pressing handles.

According to still another feature of the present invention the utility corner shelf bracket further includes: (f) at least two folding grooves at predetermined location on the utility corner shelf bracket for facilitating folding of the utility corner shelf bracket.

According to still another feature of the present invention the utility corner shelf bracket further includes: (g) at least one nail protector operatively connected to said first bow wing.

According to the present invention there is provided a curtain carrying device including: (a) two utility corner shelf bracket, the utility corner shelf bracket including: (i) a first bow, the first bow including: two first bow wings; and a first bow arc, wherein each one of the first bow wings is operatively connected to the first bow arc; (ii) at least one nail operatively connected to each one of the first bow wings; (iii) a second bow operatively connected to the first bow; (iv) a pulling assembly, having a length, operatively connected to the second bow, wherein an operation of the pulling assembly creates a pulling force on the second bow, and wherein the second bow applies force to the two first bow wings, wherein the pulling assembly includes: a turnbuckle sleeve; a central rod, having two ends, wherein one of the ends of the central rod is disposed on the second bow, and wherein one of the ends of the central rod is engaged with the turnbuckle sleeve; and a screwing rod having two ends wherein one end of the screwing rod is engaged with the turnbuckle sleeve; (v) a T rod disposed on the screwing rod; and (vi) two side rods wherein each one of the side rods is disposed on the T rod, and wherein a rotation of the turnbuckle sleeve changes the length of the pulling assembly; (vii) two first bow extenders, each one of the two first bow extenders, is disposed on the first bow; and (viii) two strengthening ribs each one of the two strengthening ribs is disposed on different one of the first bow wings; (b) two shelves wherein each one of the shelves has at least one shelf wall, and wherein each one of the shelves is disposed on a different one of the utility corner shelf bracket; and (c) at least one curtain rod, wherein the at least one curtain rod is mounted on the two shelves.

According to another feature of the present invention the utility corner shelf bracket further including: (i) at least one basket, wherein the at least one basket is disposed on the utility corner shelf bracket.

According to the present invention there is provided a method for installing a niche shelf at two corner walls, comprising the stages of: (a) applying force on both of first bow wings of a utility corner shelf bracket, which reduces an angle between both of the first bow wings; (b) placing the utility corner shelf bracket at a desired location, on one of the corner wall; and (c) mounting a corner shelf on the corner shelf bracket.

According to another feature of the present invention the method for installing a niche shelf at two corner walls further comprising the stages of: (d) applying force on both of first bow wings of a utility corner shelf bracket, which reduces an angle between both of the first bow wings; (e) placing the utility another corner shelf bracket at a desired location, on another one of the corner wall; (f) mounting a corner shelf on the another corner shelf bracket; and (g) mounting a niche shelf on the two corner shelves.

According to still another feature of the present invention each one of the corner shelves includes: (i) a shelf wall; (ii) longitudinal shelf supports, disposed on the shelf wall; and (iii) lateral shelf support; and the niche shelf has longitudinal grooves and lateral grooves.

According to the present invention there is provided a process for producing of a utility corner shelf bracket, the process including the stage of: (a) injecting material into a mold, wherein the mold has an internal volume capable for receiving the material wherein the internal volume has a shape of a utility corner shelf bracket, wherein the utility corner shelf bracket includes: (i) a first bow, having a first bow arc, and two first bow wings, wherein each one of the first bow wings is disposed on one of the first bow arc; (ii) at least one nail disposed on each one of the first bow wings; (iii) two pressing handles, wherein each one of the pressing handles is disposed on one of the first bow wings; and (iv) a second bow having two ends, wherein each one of the ends of the second bow is disposed on an element of the utility corner shelf bracket selected from a group consisting of a first bow wing, and a pressing handle, wherein the first bow arc and the second bow has elasticity characteristics, wherein the utility corner shelf bracket is a one-piece device, wherein the utility corner shelf bracket is made of an elastic material, wherein the material is a polymer.

Additional objects and advantages of the invention will be set forth in part in the description which follows and, in part, will be obvious from the description, or may be learned by practice of the invention.

BRIEF DESCRIPTION OF THE DRAWINGS

FIG. 16d is a top schematic illustration of a shelf, according to the present invention.

FIG. 16e is a side view schematic illustration of a shelf, according to the present invention.

FIG. 16f is an isometric bottom view schematic illustrations of a niche shelf, according to the present invention.

FIG. 17a is a side view schematic illustration of a shelf, assembled at a wall ceiling corner, according to the present invention.

FIG. 17b is an isometric view schematic illustration of a curtain carrying device, according to the present invention.

FIG. 17c is a top view schematic illustration of a curtain carrying device, according to the present invention.

DETAILED DESCRIPTION OF EMBODIMENTS

Figure 1:
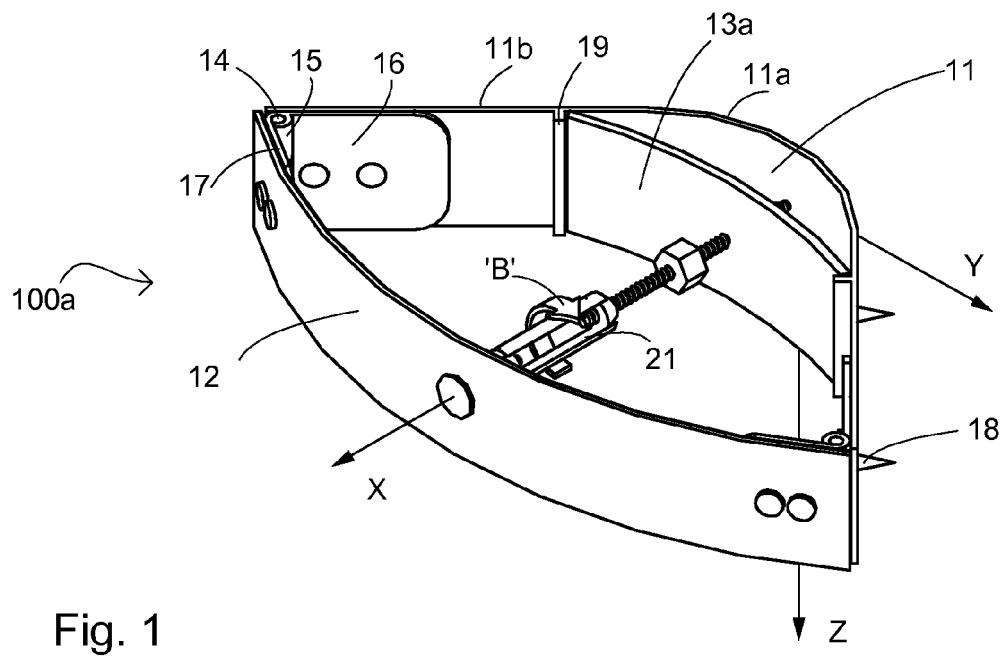
FIG. 1 is an isometric schematic illustration of an illustrative, exemplary first embodiment of a utility corner shelf bracket, according to the present invention.

The present invention is of a utility corner shelf bracket and of a method for its installation with a shelf in a corner wall, and a method of removing them from the corner wall.

The principles and operation of a utility corner shelf bracket according to the present invention may be better understood with reference to the drawings and the accompanying description. Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

To remove any doubt, note that the manner in which the elements of the present invention are described in the illustrations can be highly detailed, however is not in any way limiting the present illustration, but rather is for the purpose of clarification and furthering understanding. The present invention can be implemented in embodiments that differ from the specification given with regard to the illustration.

The following list is a legend of the numbering of the application illustrations:

11 first bow
11a first bow arc
11b first bow wing
11c first bow extender
11d second bow extender
12 second bow
12a first end of a second bow
12b second end of a second bow
13a third bow (of first embodiment)
13d third bow (of fourth embodiment)
13da third bow first end (of fourth embodiment)
13db third bow second end (of fourth embodiment)
13e third bow (of fifth embodiment)
13ea third bow first end (of fifth embodiment)
13eb third bow second end (of fifth embodiment)
14 hinge 15 socket
16 first socket plate
17 second socket plate
18 nail
19 support
20 pulling assembly
21a turnbuckle sleeve (of first embodiment)
21c turnbuckle sleeve (of second and third and embodiments)
23a second screwing rod (of first embodiment)
23c second screwing rod (of second, third, and fourth embodiments)
24 first nut
25 second nut
26 tension bolt
27b central rod (of second embodiment)
27c central rod (of second, third, and fourth embodiments)
28 side rod
29 pivot
30 strengthening rib
31 T rod
32 support rod
33 cap
34 notch
35a rear gripping area
35b front gripping area
36 pressing handle
37 hanging device
38 nail hole
39 folding groove
40 load
50 nail protector
50a protector connector
50b protector pin
50c first bow wing hole
100a utility corner shelf bracket (first embodiment)
100b utility corner shelf bracket (second embodiment)
100c utility corner shelf bracket (third embodiment)
100d utility corner shelf bracket (fourth embodiment)
100e utility corner shelf bracket (fifth embodiment)
100f utility corner shelf bracket (sixth embodiment)
100g utility corner shelf bracket (seventh embodiment)
100h utility corner shelf bracket (eighth embodiment)
101 corner wall
102 corner shelf
102a longitudinal shelf support
102b lateral shelf support
102c shelf wall
102d shelf hole
103 niche shelf
103a longitudinal groove
103b lateral groove
104 wall ceiling corner
105 curtain rod
106 basket
107 curtain carrying device When the accompanying description of a specific illustration mentions an element not shown in that illustration or without numbering, its numbering is shown in parentheses, and can be found in one or more other illustrations.

Referring now to the drawings, FIG. 1 is an isometric schematic illustration of an illustrative, exemplary first embodiment of a utility corner shelf bracket 100a, (first embodiment), according to the present invention.

The utility corner shelf bracket 100a (first embodiment) includes a first bow 11 and a second bow 12, connected to each other at their ends so as to enable angular movement between their ends around two hinges 14, one at each end, which form a closed shape from top view. Each hinge 14 is assembled within a socket 15, which can be an integral part of a first socket plate 16, which is engaged with an additional socket, which can be an integral part of a second socket plate 17, while the two first socket plates 16 are disposed near both ends of the first bow 11, and the two second socket plates 17 are disposed near both ends of the second bow 12.

In another possible embodiment, the sockets are integral parts of the first bow 11 and the second bow 12. The first bow 11 and second bow 12 have arced shapes, while the center point of the first bow 11 is origin of a Cartesian axis system, whose axes X, Y, and Z, are in directions shown in the present illustration: the X axis is in the direction of the center point of the second bow 12, the Y axis is to the left, in view from the origin, on a plane parallel to that on which the first bow 11 and second bow 12 are placed so that after assembly to a corner wall (101), assuming that its walls are vertical, it is essentially a horizontal plane, and the Z axis in this state is vertically downwards. The central part of first bow 11 has a first bow arc 11a and two first bow wings 11b, each of which progresses to one of either end of first bow arc 11a, and whose shape is planar after assembly to the corner wall (101), (if the wall is planar), as will be shown in FIG. 2. The external side of each first bow wing 11b has several nails 18, which are designated for insertion into the corner wall (101) after assembly, in order to prevent movement between the utility corner shelf bracket 100a (first embodiment), and the corner wall (101). In order to facilitate the prevention of movement, the external surface of each first bow wing 11b can have a high friction coefficient, which can be achieved either by selection of the material and the processing of the surface, or by adding an external layer of a suitable material, such as a layer of rubber.

The first bow 11 and second bow 12 can be composed of various materials, such as aluminum, and have a good ability for bending on the XY plane, suitable for manual forces applied on a pulling assembly (20), while they are durable to loads in the direction of the Z axis which may be applied to the corner shelf 102 while it is mounted upon the utility corner shelf bracket 100a (first embodiment).

Inwards from the first bow 11 and second bow, is a third bow 13a, (of the first embodiment), whose ends rest upon two supports 19, each of which is disposed on the internal side of the first bow 11 for the purpose of transmitting forces from the first bow 11 and second bow 12, which are generated at a certain point which will be described later on, by the pulling assembly 20. Note that this form of force transmission from the third bow 13a, (of the first embodiment), to the first bow 11, is one viable option of several, and does not limit the present invention in any way.

The pulling assembly (20), one possible structure of which, and whose method of action, will be specified later on, includes a turnbuckle sleeve 21a, with left and right hand internal threads on both ends, which can be rotated to the left or to the right, for purposes that will be specified later on, around axis X, with the rotation leftward in view from the origin, around axis X, marked in the present illustration with arrow 'B'.

Figure 2:
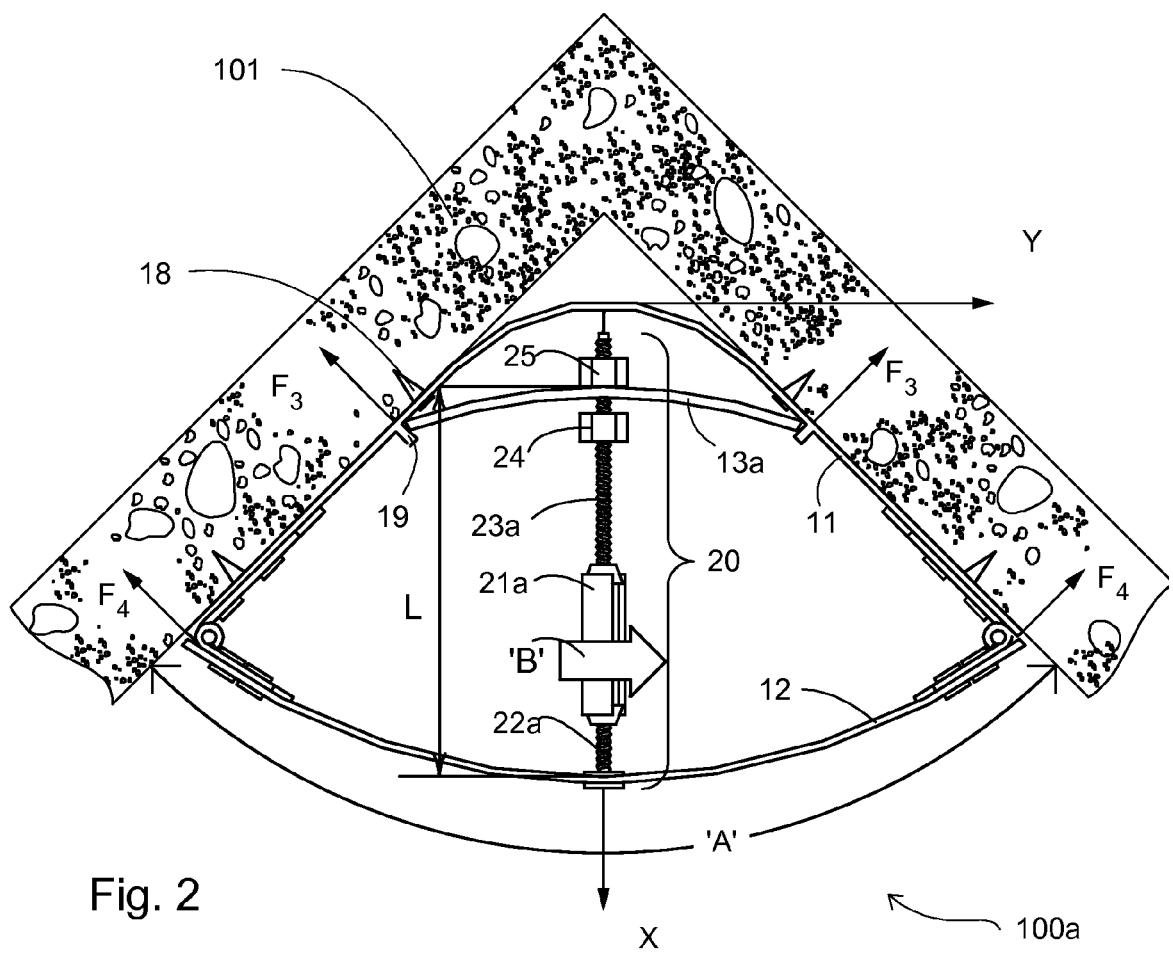
FIG. 2 is a top schematic illustration of an illustrative, exemplary first embodiment of a utility corner shelf bracket, installed in a corner wall, according to the present invention.

FIG. 2 is a top schematic illustration of an illustrative, exemplary first embodiment of a utility corner shelf bracket 100a (first embodiment), installed on a corner wall 101, according to the present invention.

In this state, the angle 'A' formed between both of the first bow wings 11b, equals the angle formed between both walls comprising the corner wall 101, and the nails 18 are inserted in the walls. In this state, a corner shelf 102 can be placed upon the utility corner shelf bracket 100a (first embodiment).

The angle 'A' is, in most cases, of 90 degrees, however the utility corner shelf bracket 100a (first embodiment), can also be installed in other values of this angle.

The pulling assembly 20, which can apply pulling force, is disposed along the X axis, between the second bow 12, and the third bow 13a (of the first embodiment), which applies forces $F_3$ on the first bow wings lib. This pulling also causes the second bow 12 to apply forces $F_4$ on the first bow wings lib. These force components fasten the first bow wings lib towards the two walls of the corner wall 101.

The pulling assembly 20, shown in the illustrations of the present patent application, includes two rods, a first screwing rod 22a, with external threads in a first direction, and a second screwing rod 23a, with external threads in a second direction.

The two rods are engaged with turnbuckle sleeve 21a, namely are screwed into turnbuckle sleeve 21a, which has left and right hand internal threads at both of its ends and ability to rotate left and right around the X axis, as shown by arrow 'B'.

The turnbuckle sleeve 21a can be shaped as a cylinder with a closed wall or partial wall, as shown in the illustrations of the present application.

The first screwing rod 22a is connected to a second bow 12, and the second screwing rod 23a is connected to a third bow 13a (of the first embodiment), through a hole in its center, and its location, according to one embodiment, can be adjusted by means of a first nut 24, and a second nut 25. In this manner, the operation of the pulling assembly 20, which is done by means of rotation of the turnbuckle sleeve 21a, in one direction, changing its length L, results in the first rod 22a and the second screwing rod 23a moving towards one another, creating the pulling force described above, while rotation in the other direction causes the rods to move away from one another, and the pulling force, is replaced by a pushing force which reverses the directions of forces $F_3$ and $F_4$, thus decreasing the angle 'A' between the two first bow wings lib and therefore causing their moving away and the removal of the nails 18 from the walls.

Figure 3:
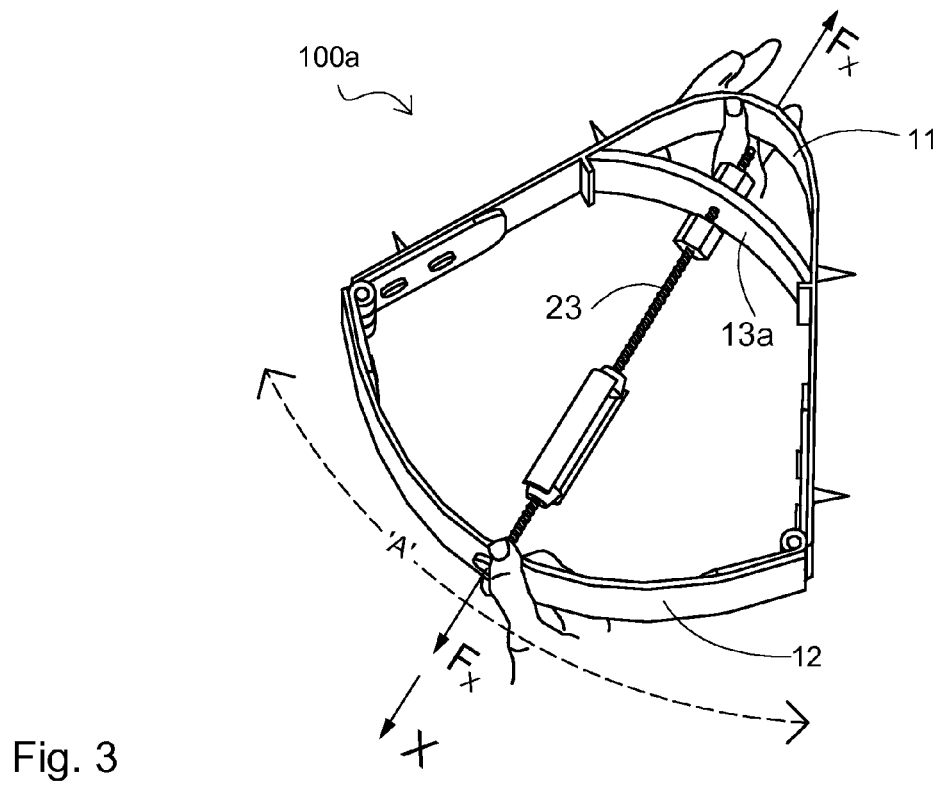
FIG. 3 is an isometric schematic illustration of an illustrative, exemplary first embodiment of a utility corner shelf bracket, at a stage prior to installation, according to the present invention.

FIG. 3 is an isometric schematic illustration of an illustrative, exemplary first embodiment of a utility corner shelf bracket 100a (first embodiment), at a stage prior to installation, according to the present invention.

At this stage, the installing person, who can be without any special expertise, uses both hands to tension the utility corner shelf bracket 100a (first embodiment), along the X axis, ensuring that the angle 'A' is small enough to bring close to the corner wall 101.

Figure 4:
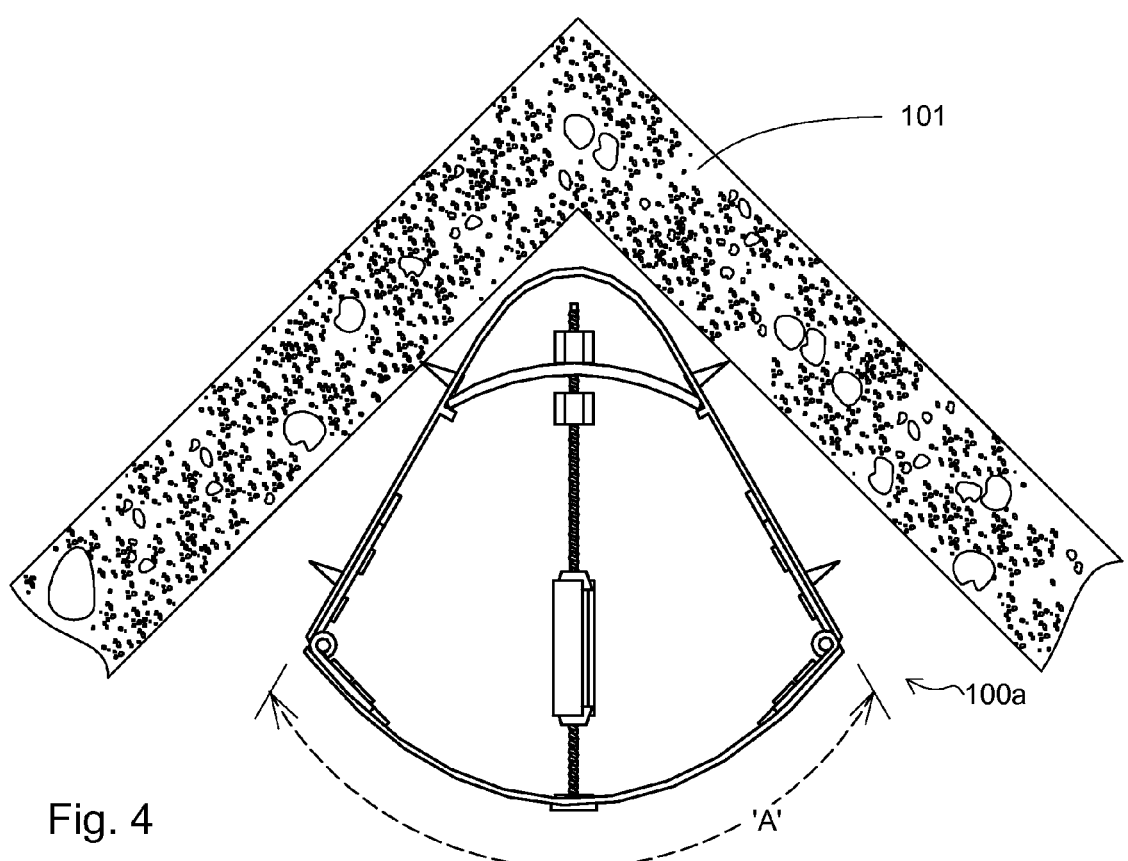
FIG. 4 is a top schematic illustration of an illustrative, exemplary first embodiment of a utility corner shelf bracket, in a corner wall, at a stage prior to installation, according to the present invention.

FIG. 4 is a top schematic illustration of an illustrative, exemplary first embodiment of a utility corner shelf bracket 100a (first embodiment), installed at a corner wall 101, at a stage prior to installation, according to the present invention.

Because angle 'A' is sufficiently small, the utility corner shelf bracket 100a (first embodiment), can be brought close to the corner wall 101, as shown in the present illustration, for the purpose of installation.

Figure 5:
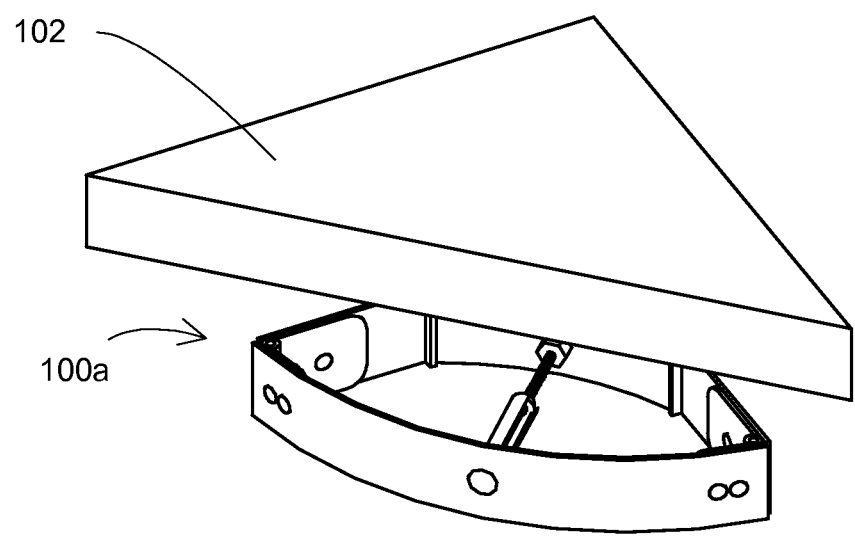
FIG. 5 is an isometric schematic illustration of an illustrative, exemplary first embodiment of a utility corner shelf bracket, and a shelf, at a stage prior to placing the shelf on the utility corner shelf bracket, according to the present invention.

FIG. 5 is an isometric schematic illustration of an illustrative, exemplary first embodiment of a utility corner shelf bracket 100a (first embodiment), and a corner shelf 102, at a stage prior to placing the shelf 102 on the utility corner shelf bracket 100, (first embodiment), according to the present invention.

Figure 6:
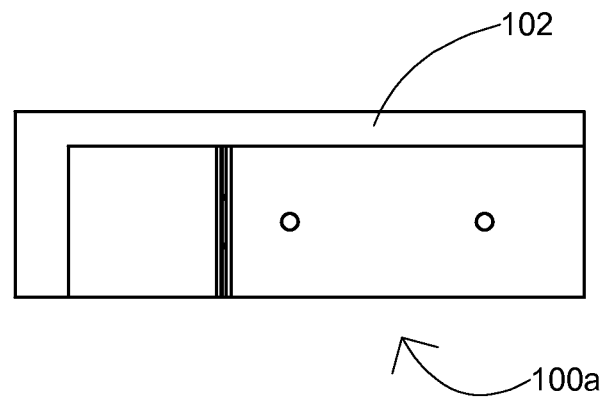
FIG. 6 is a right side schematic illustration of an illustrative, exemplary first embodiment of a utility corner shelf bracket, and a shelf, at a stage following placing the shelf on the utility corner shelf bracket, according to the present invention.

FIG. 6 is a right side schematic illustration of an illustrative, exemplary first embodiment of a utility corner shelf bracket 100a (first embodiment), and a corner shelf 102, at a stage following placing the corner shelf 102 upon the utility corner shelf, according to the present invention.

The invention according to the present patent application is not limited to the installation of the utility corner shelf bracket 100a (first embodiment), in corners of vertical walls, and it can also be installed, for example, in a corner formed between a wall and a ceiling.

A method for installing a utility corner shelf bracket (100a) (first embodiment), and a corner shelf (102) at a corner wall includes the stages of:
  providing a utility corner shelf bracket (100a) (first embodiment)), and a shelf (102);
  tensioning the utility corner shelf bracket (100a) (first embodiment);
  turning the turnbuckle sleeve (21a), until the nails (18) are sufficiently inserted into the walls; and
  placing the corner shelf (102) upon the utility corner shelf bracket.

The method for removing a utility corner shelf bracket (100a) (first embodiment), and a corner shelf (102) from a corner wall includes the stages of:
  removing the corner shelf (102) from the utility corner shelf bracket (100a) (first embodiment);
  turning the turnbuckle sleeve, until reaching extraction of the nails (18) from the walls; and
  removing the utility corner shelf bracket (100a) (first embodiment) from the corner wall.

The following illustrations and the accompanying description specifies additional embodiments.

Many of the structural features and qualities typical of the first embodiment also apply to these additional embodiments. Various combinations of structural elements and features mentioned in the present patent application can serve for additional embodiments of the utility corner shelf bracket according to the present invention.

Figure 7A:
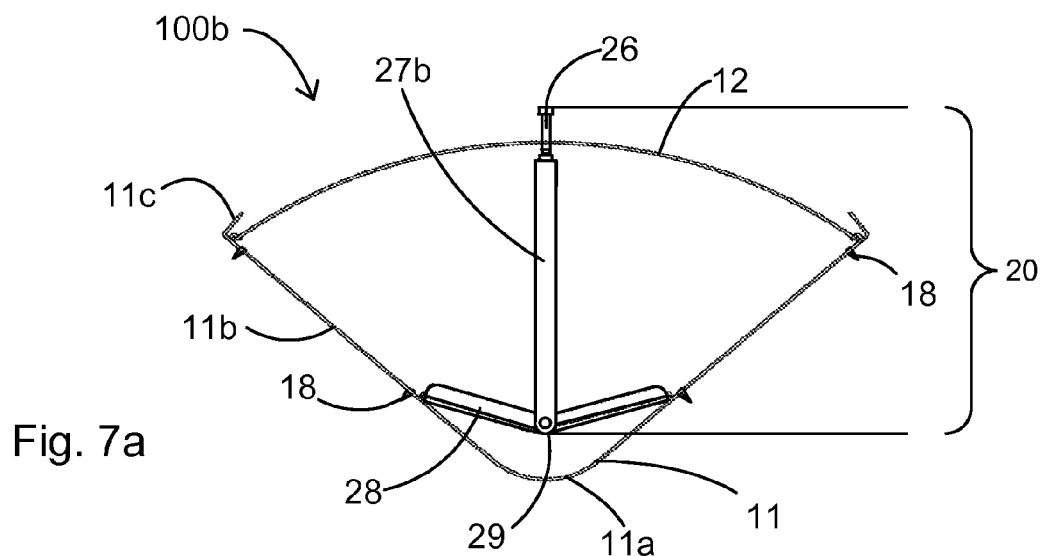
FIG. 7a is a top schematic illustration of an illustrative, exemplary second embodiment of a utility corner shelf bracket, according to the present invention.

FIG. 7a is a top schematic illustration of an illustrative, exemplary second embodiment of a utility corner shelf bracket 100b, according to the present invention.

The pulling assembly 20 of the present illustration includes a tension bolt 26, and a central rod 27b (of the second embodiment), which is connected, by means of a pivot 29, to two side rods 28 in lieu of the third bow (13a). Each of both ends of the first bow 11 can have the optional addition of a first bow extender lie whose top view shape can be straight, round, etc., and it is designated to increase the area of contact with the corner shelf (102).

The first bow 11 has a first bow arc 11a and two first bow wings lib, each of which progresses to one of either end of first bow arc 11a, and whose shape is planar after assembly to a corner wall (101) (if the wall is planar).

Figure 7B:
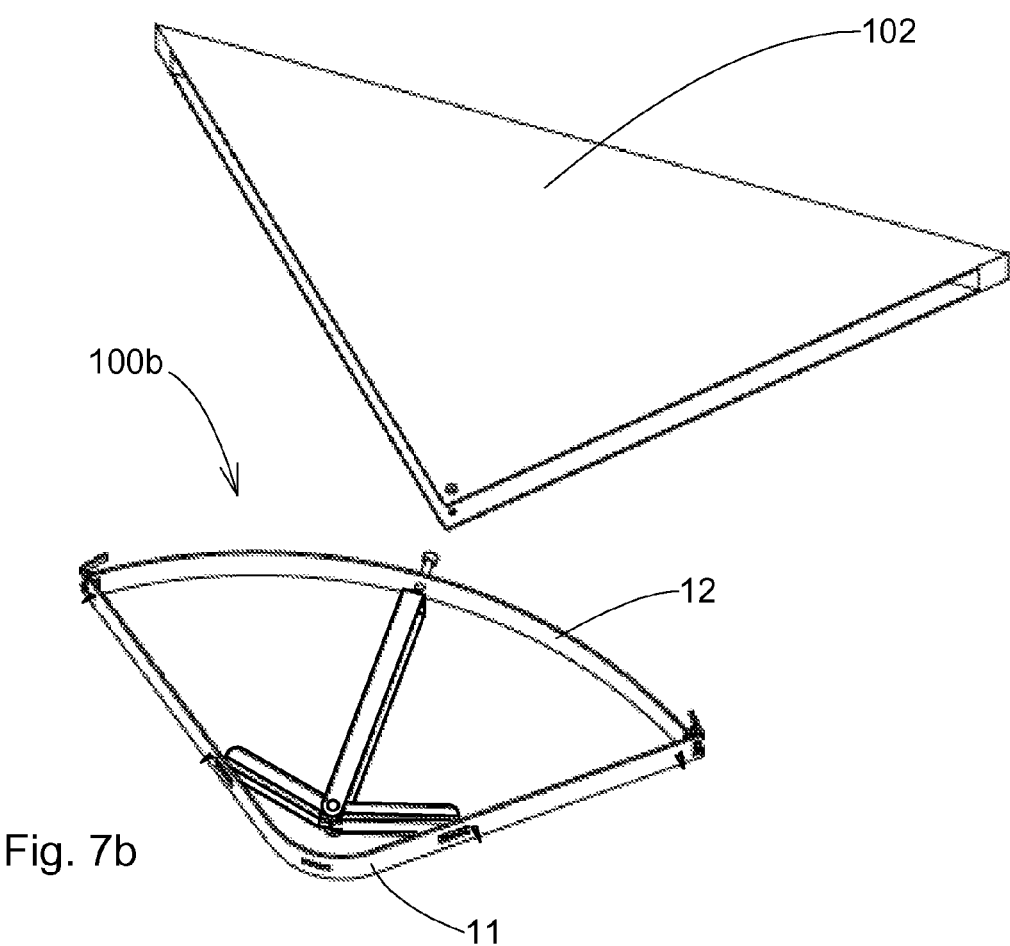
FIG. 7b is an isometric schematic illustration of an illustrative, exemplary second embodiment of a utility corner shelf bracket, and a shelf, according to the present invention.

FIG. 7b is an isometric schematic illustration of an illustrative, exemplary second embodiment of a utility corner shelf bracket 100b, and a corner shelf 102, according to the present invention. Corner shelf 102, shown in the present illustration, is one of many possible configurations. In this case, its installation is not by means of placing from the top, but rather horizontal insertion upon a utility corner shelf bracket, which is suitable for various embodiments of the utility corner shelf bracket.

Figure 8A:
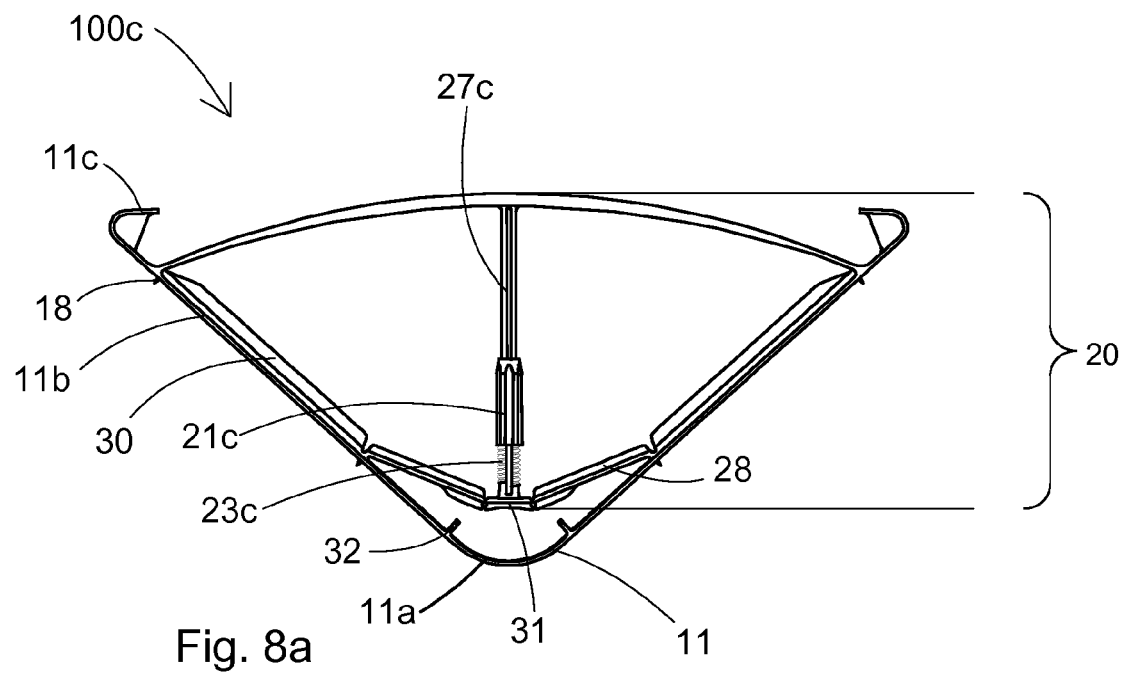
FIG. 8a is a top schematic illustration of an illustrative, exemplary third embodiment of a utility corner shelf bracket, according to the present invention.

FIG. 8a is a top schematic illustration of an illustrative, exemplary third embodiment of a utility corner shelf bracket 100c, according to the present invention.

The pulling assembly 20 of the present illustration includes a central rod 27c (of second, third, and fourth embodiments), a turnbuckle sleeve 21c (of second, third, and fourth embodiments), and a second screwing rod 23c (of second, third, and fourth embodiments), whose end is connected to a T rod 31, both of whose ends have shafts which are connected to two side rods 28, as shown in the illustration.

The central part of first bow 11 has a first bow arc 11a and two first bow wings 11b, each of which progresses to one of either end of first bow arc 11a, and whose shape is planar after assembly to a corner wall (101) (if the wall is planar).

The internal wall of the first bow 11 has at least one support rod 32, which prevents overextension, and thus protects the user's fingers. Each first bow wing 1ib on the internal wall is connected to a strengthening rib 30, which provides additional resistance to bending and facilitates mounting up to a wall.

The first bow extenders lie shown in the present illustration are of another possible top view shape, and as noted, are designated to increase the area of contact with the corner shelf (102).

Figure 8B:
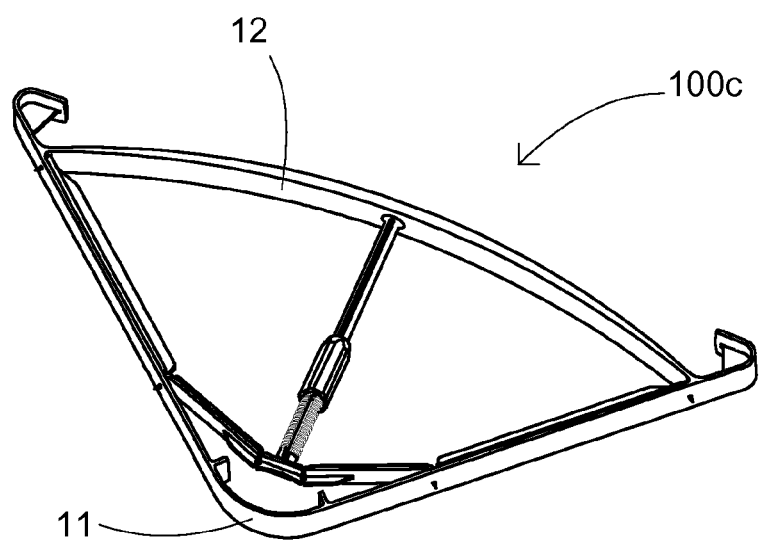
FIG. 8b is an isometric schematic illustration of an illustrative, exemplary second embodiment of a utility corner shelf bracket, according to the present invention.

FIG. 8b is an isometric schematic illustration of an illustrative, exemplary second embodiment of a utility corner shelf bracket 100c, according to the present invention.

Figure 9A:
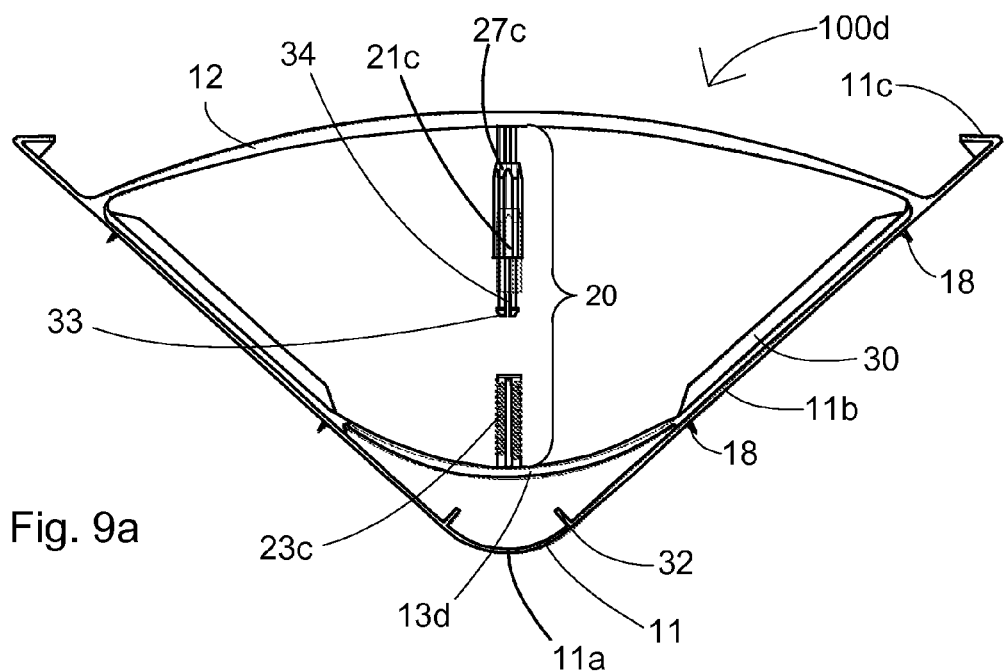
FIG. 9a is a top schematic illustration of an illustrative, exemplary fourth embodiment of a utility corner shelf bracket, according to the present invention.

FIG. 9a is a top schematic illustration of an illustrative, exemplary fourth embodiment of a utility corner shelf bracket 100d, according to the present invention.

The fourth embodiment of a utility corner shelf bracket 100d has much in common with the third embodiment of a utility corner shelf bracket (100c). The main difference is that the fourth embodiment of a utility corner shelf bracket 100d has a third bow 13d (of the fourth embodiment) in lieu of the T rod 31 and support rods 32. The turnbuckle sleeve 21c (of the of second, third, and fourth embodiments), has internal screw threading only on one end. Its other end has free rotational movement around the central rod 27c (of the of second, third, and fourth embodiments). The end of the central rod 27c has a cap 33 which prevents the turnbuckle sleeve 21c from disconnecting from the central rod 27c. The central rod 27c and the cap 33 each have a notch 34 which enables mounting the turnbuckle sleeve 21c upon the central rod 27c.

The first bow 11 has a first bow arc 11a and two first bow wings 1ib, each of which progresses to one of either end of first bow arc 11a, and whose shape is planar after assembly to a corner wall (101) (if the wall is planar).

The fourth embodiment of a utility corner shelf bracket 100d has a pulling assembly 20.

Figure 9B:
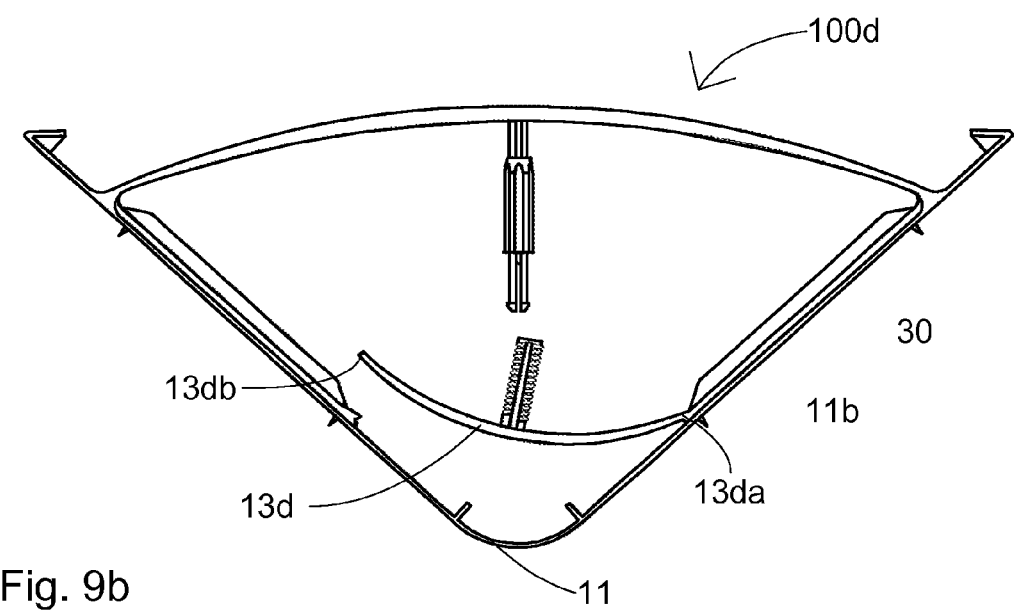
FIG. 9b is a top schematic illustration of an illustrative, exemplary fourth embodiment of a utility corner shelf bracket, according to the present invention.

FIG. 9b is a top schematic illustration of an illustrative, exemplary fourth embodiment of a utility corner shelf bracket 100d, according to the present invention. The present illustration shows that the third bow 13d (of the fourth embodiment) has two ends, the third bow first end 13da (of the fourth embodiment), which has a fixed connection to first bow wing 1ib, while the third bow second end 13db (of the fourth embodiment) can be free, as shown in the present illustration, to facilitate initial bending of the first bow 11.

Figure 10A:
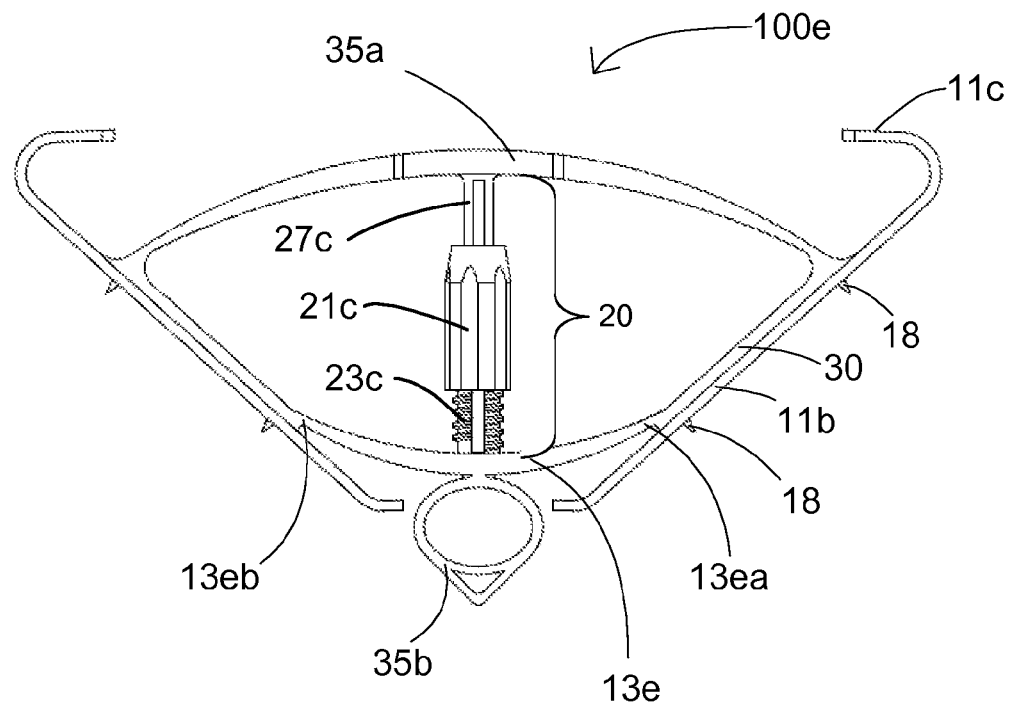
FIG. 10a is a top schematic illustration of an illustrative, exemplary fifth embodiment of a utility corner shelf bracket, according to the present invention.

FIG. 10a is a top schematic illustration of an illustrative, exemplary fifth embodiment of a utility corner shelf bracket 100e, according to the present invention.

The fifth embodiment of a utility corner shelf bracket 100e has a lot in common with the fourth embodiment of a utility corner shelf bracket 100d. The main difference is that the fifth embodiment of a utility corner shelf bracket 100e has no complete first bow 11 and furthermore, both the third bow first end 13ea (of the fifth embodiment) and the third bow second end 13eb (of the fifth embodiment) of the third bow 13e (of the fifth embodiment), have a fixed connection to either first bow wing 1ib or strengthening rib 30. Furthermore, in order to facilitate extension, the fifth embodiment of the utility corner shelf bracket 100e includes two gripping areas, rear gripping area 35a and front gripping area 35b, which in the case of the present illustration are suitable for insertion of a finger.

The fifth embodiment of a utility corner shelf bracket 100e has a pulling assembly 20.

Figure 10B:
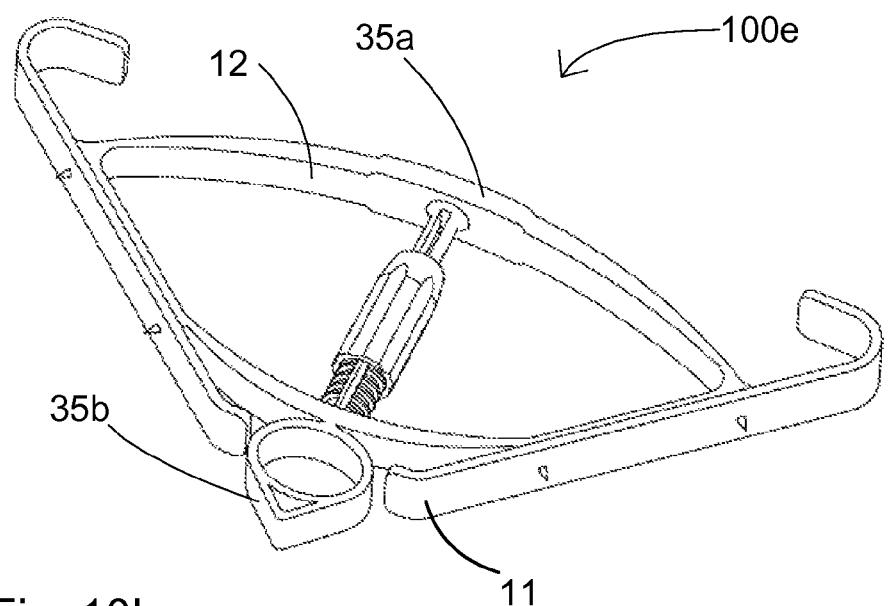
FIG. 10b is an isometric schematic illustration of an illustrative, exemplary fifth embodiment of a utility corner shelf bracket, according to the present invention.

FIG. 10b is an isometric schematic illustration of an illustrative, exemplary fifth embodiment of a utility corner shelf bracket 100e, according to the present invention.

The present illustration shows that the rear gripping area 35a has a large width dimension relative to the width dimension of the second bow 12.

Figure 11A:
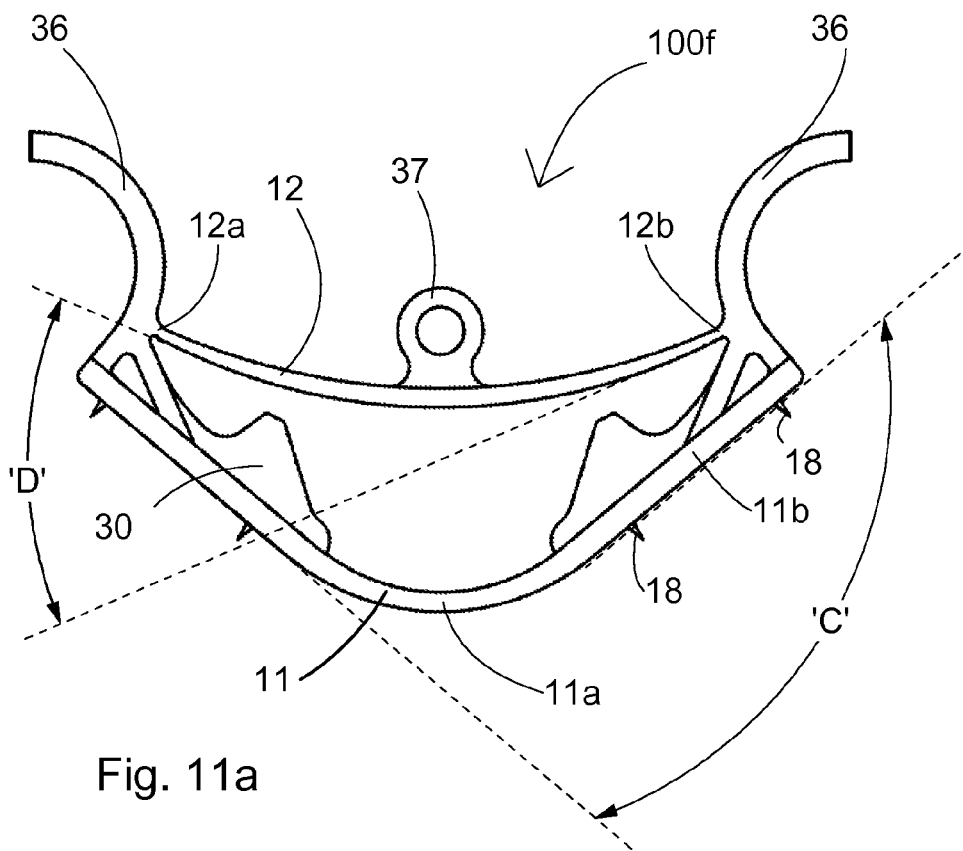
FIG. 11a is a top schematic illustration of an illustrative, exemplary sixth embodiment of a utility corner shelf bracket, according to the present invention.

FIG. 11a is a top schematic illustration of an illustrative, exemplary sixth embodiment of a utility corner shelf bracket 100f, according to the present invention. The sixth embodiment of a utility corner shelf bracket 100f does not have any pulling assembly and the forces attaching it to the walls come from the elasticity of the first bow 11 and the second bow 12, which are, for all practical purposes, springs.

Compression prior to mounting in a wall corner is done by means of pressing two pressing handles 36. When the dimensions of the sixth embodiment of a utility corner shelf bracket 100f are sufficiently small, the compression can be done with one hand. Likewise, the sixth embodiment of a utility corner shelf bracket 100f can also include a hanging device 37, to which one can, for example, tie a string with a balloon on its end.

The second bow 12 has two ends, a first end of a second bow 12a, and a second end of a second bow 12b, while each end is disposed directly to the end of each of the two first bow wings 1ib or to one of the two pressing handles 36, while both options are acceptable and efficient.

The state shown in the present illustration is a free state, namely, there is no influence of any external forces on the utility corner shelf bracket 100f (sixth embodiment), and its shape is determined by the equilibrium of the internal elastic forces.

The first bow 11, which is a spring, as noted, is bent in the free state bow arc bending angle 'C', the value of which is smaller than 90 degrees, while the second bow 12, which is also a spring, as noted, is bent at second bow bending angle 'D'. It has been determined that for the purpose of effective functioning of the utility corner shelf bracket 100f (sixth embodiment), the angle 'D' must be larger than a value suitable for a given model of utility corner shelf bracket 100f according to its structure and its composing materials. A typical value is bending of 40 degrees.

The present illustration shows that strengthening ribs 30 can have a suitable shape and dimensions to serve as buffers preventing excessive compression of the sixth embodiment of a utility corner shelf bracket 100f. The sixth embodiment of a utility corner shelf bracket 100f can be composed of a single part and of a single material, without any moving parts, namely without any hinges or the like, and it can be manufactured in an injection process, without any connection means such as adhesives, welding, screws, etc. between its various parts.

Good materials for the production of a sixth embodiment of a utility corner shelf bracket 100f can be selected from the group of polymers.

Figure 11B:
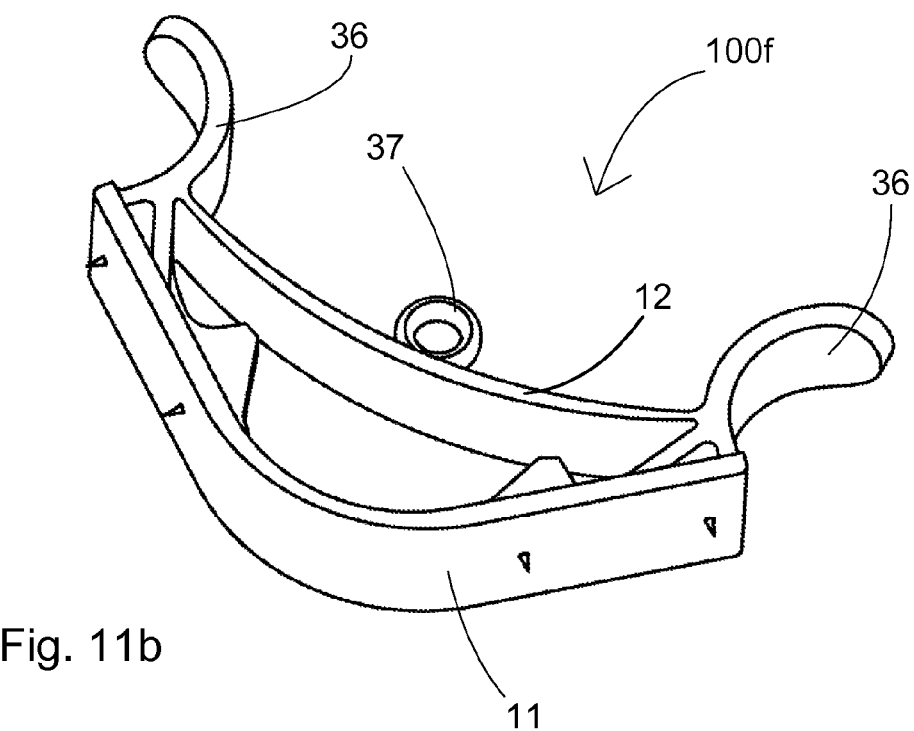
FIG. 11b is an isometric schematic illustration of an illustrative, exemplary sixth embodiment of a utility corner shelf bracket, according to the present invention.

FIG. 11b is an isometric schematic illustration of an illustrative, exemplary sixth embodiment of a utility corner shelf bracket 100f, according to the present invention.

Figure 11C:
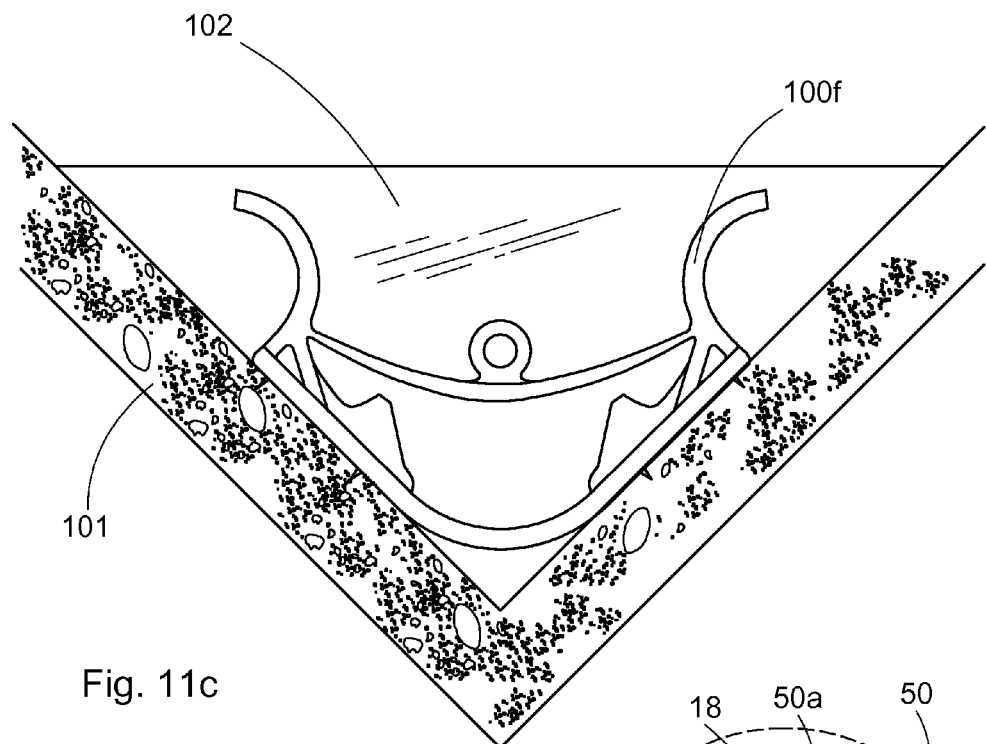
FIG. 11c is a top schematic illustration of an illustrative, exemplary sixth embodiment of a utility corner shelf bracket, installed in a corner wall upon which is mounted a shelf, according to the present invention.

FIG. 11c is a top schematic illustration of an illustrative, exemplary sixth embodiment of a utility corner shelf bracket 100f, installed in a corner wall 101 upon which is mounted a corner shelf 102, according to the present invention.

Corner shelf 102 can be transparent, as shown in the present illustration, or opaque. The corner wall 101 shown in the present illustration has an angle of practically ninety degrees, and the corner shelf bracket 100f was mounted into the corner after it was sufficiently compressed from its released mode, and after being placed next to the corner wall 101, opened and latched into place by means of its elasticity.

Figure 11D:
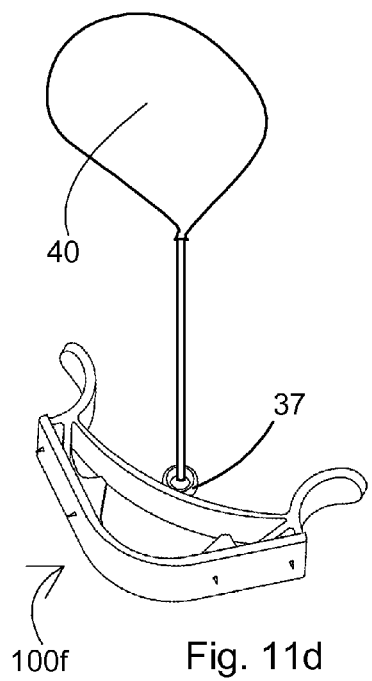
FIG. 11d is an isometric schematic illustration of an illustrative, exemplary sixth embodiment of a utility corner shelf bracket, which is attached to a load, according to the present invention.

FIG. 11*d* is an isometric schematic illustration of an illustrative, exemplary sixth embodiment of a utility corner shelf bracket 100*f* which is attached to a load 40, according to the present invention.

Load 40, in the case of the present illustration, is a string and an attached balloon which is filled with a gas lighter than air so that it floats upwards. Load 40 can also be heavier than air, and can include various different means, such as string, chains, hooks, or connectors for connection to the utility corner shelf bracket 100*f*. The connection can be to hanging device 37 as well as to other locations of the utility corner shelf bracket 100*f*.

Figure 11E:
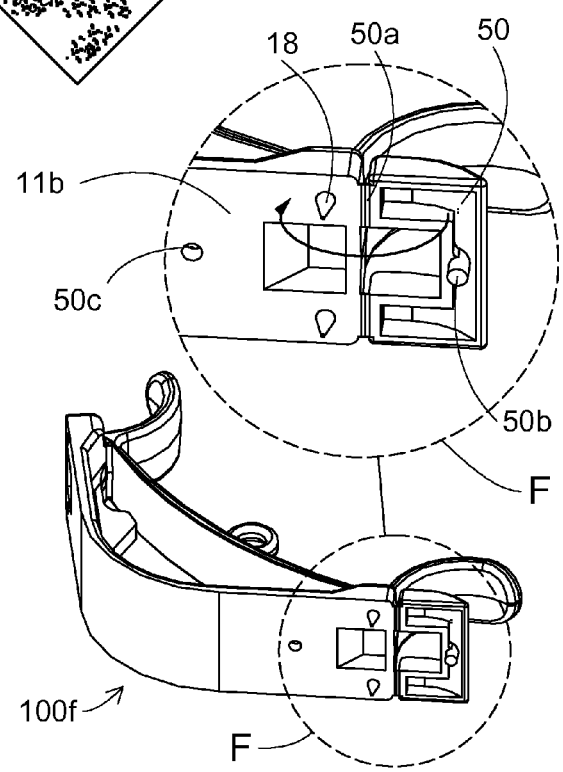
FIG. 11e is an isometric schematic illustration of an illustrative, exemplary sixth embodiment of a utility corner shelf bracket having a protector connector, according to the present invention.

FIG. 11*e* is an isometric schematic illustration of an illustrative, exemplary sixth embodiment of a utility corner shelf bracket 100*f* having a nail protector 50, according to the present invention.

In order to reduce the risk of injury from a nail 18, the utility corner shelf bracket 100*f* can be equipped with nail protectors 50, one of which is shown in the present illustration.

The illustration marks detail F in a circle, which is magnified in the circle on the upper side of the illustration, which also shows the nail protector 50.

Nail protector 50 is connected to first bow wing 11*b* by means of a protector connector 50*a*, which is thin relative to the thickness of the first bow wing 11*b*, enabling bending and shifting the protector connector 50*a* from an open state, as shown in the present illustration, to a closed state (by rotational movement as indicated by an arrow in the illustration), in which the protector connector 50*a* covers nails 18.

The protector connector 50*a* can also be equipped with a protector pin 50*b*, which in a closed state will be inserted into a first bow wing hole 50*c*, in which it will be held by forces of friction, until force is applied to release it.

Figure 12A:
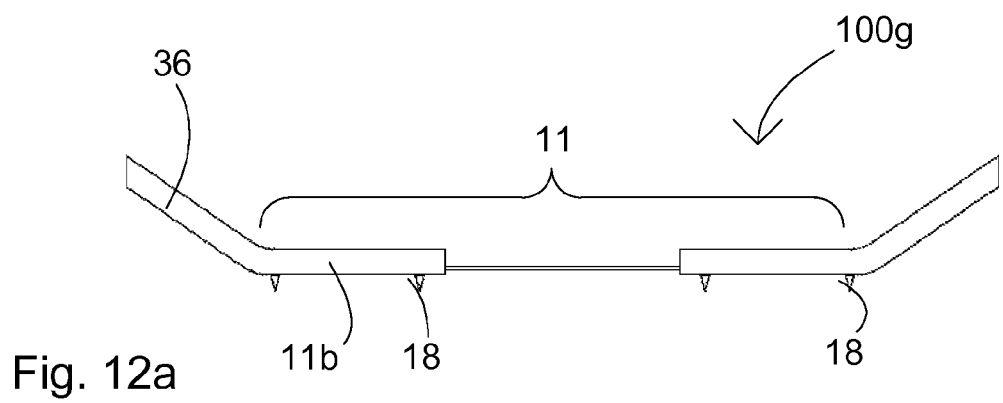
FIG. 12a is a top schematic illustration of an illustrative, exemplary seventh embodiment of a utility corner shelf bracket, according to the present invention, in open mode.

FIG. 12*a* is a top schematic illustration of an illustrative, exemplary seventh embodiment of a utility corner shelf bracket 100*g*, according to the present invention, in open mode.

The main feature of the seventh embodiment of a utility corner shelf bracket 100*g* is its small amount of components, and particularly the absence of the second bow (12) and pulling assembly (20). When it is not mounted in a wall corners it can be in a mode in which the first bow 11 is open on one straight plane.

The forces attaching the seventh embodiment of a utility corner shelf bracket 100*g* to the walls come from the elasticity of the first bow 11. The first bow 11 can be made of a flexible metal or plastic material, and the entire seventh embodiment of a utility corner shelf bracket 100*g* can be manufactured as a single integrated unit.

Figure 12B:
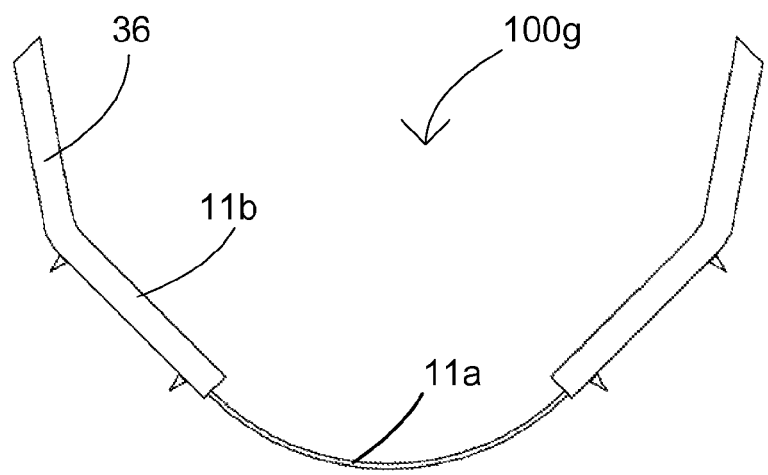
FIG. 12b is a top schematic illustration of an illustrative, exemplary seventh embodiment of a utility corner shelf bracket, according to the present invention, in bent mode.

FIG. 12*b* is a top schematic illustration of an illustrative, exemplary seventh embodiment of a utility corner shelf bracket 100*g*, according to the present invention, in bent mode.

Figure 12C:
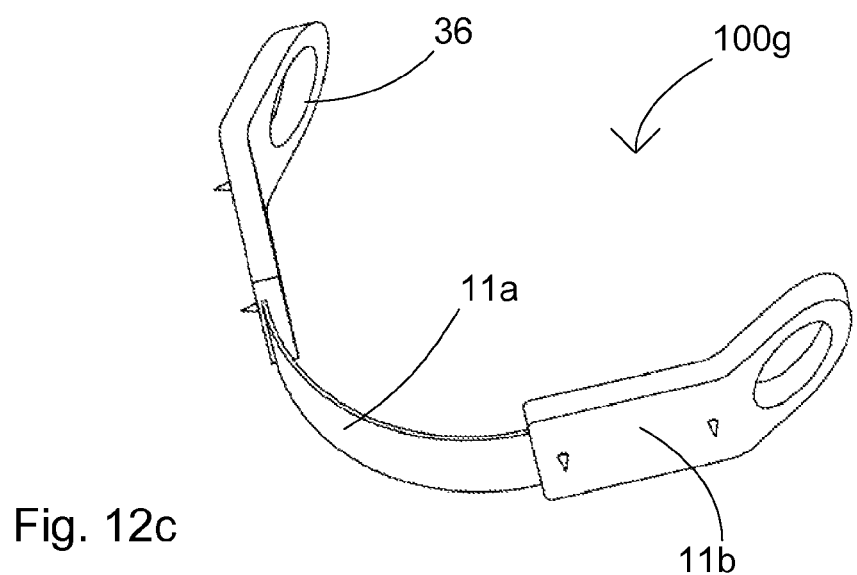
FIG. 12c is an isometric schematic illustration of an illustrative, exemplary seventh embodiment of a utility corner shelf bracket, according to the present invention, in folded mode.

FIG. 12*c* is an isometric schematic illustration of an illustrative, exemplary seventh embodiment of a utility corner shelf bracket 100*g*, according to the present invention, in bent mode.

The pressing handles 36 can be designed to be suitable for convenient use with fingers.

Figure 13A:
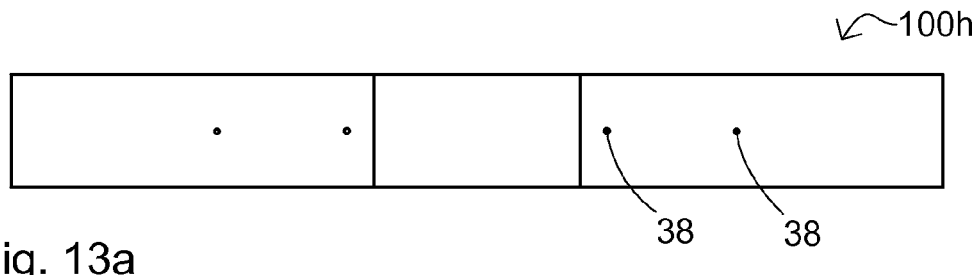
FIG. 13a is a front schematic illustration of an illustrative, exemplary eighth embodiment of a utility corner shelf bracket, according to the present invention in folded mode.

FIG. 13*a* is a front schematic illustration of an illustrative, exemplary eighth embodiment of a utility corner shelf bracket 100*h*, according to the present invention in folded mode.

The eighth embodiment of the utility corner shelf bracket 100*h* can also be made of a flexible plastic material and, when not in use, can be folded into two flat layers, with the nails (18) concealed in nail holes 38, to prevent any risk of injury.

Figure 13B:
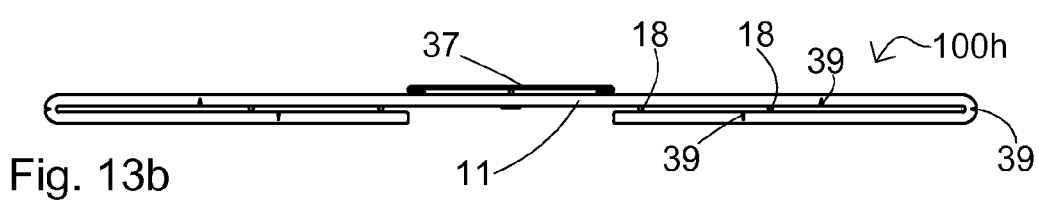
FIG. 13b is a top schematic illustration of an illustrative, exemplary eighth embodiment of a utility corner shelf bracket, according to the present invention, in folded mode.

FIG. 13*b* is a top schematic illustration of an illustrative, exemplary eighth embodiment of a utility corner shelf bracket 100*h*, according to the present invention, in folded mode.

The parts of the eighth embodiment of the utility corner shelf bracket 100*h* can also include folding grooves 39, to facilitate folding.

The illustration also shows hanging device 37, which can also be made of a flexible plastic material.

Figure 13C:
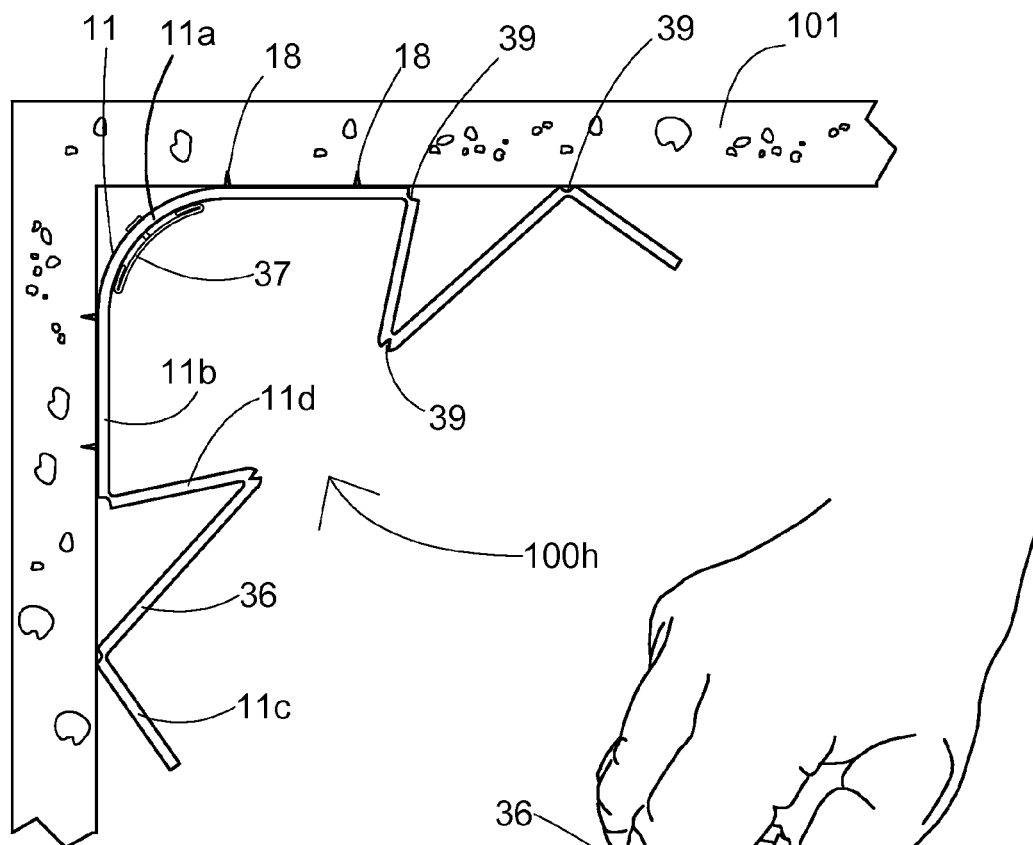
FIG. 13c is a top schematic illustration of an illustrative, exemplary eighth embodiment of a utility corner shelf bracket, installed in a corner wall, according to the present invention.

FIG. 13*c* is a top schematic illustration of an illustrative, exemplary eighth embodiment of a utility corner shelf bracket 100*h*, installed in a corner wall, according to the present invention. Other than hanging device 37 and the nails 18, all components of the eighth embodiment of the utility corner shelf bracket 100*h* are one single piece of material with holes and folding grooves. The first bow 11 has a first bow arc 11*a* and two first bow wings 11*b*, each of which progresses to one of either end of first bow arc 11*a*.

Figure 13D:
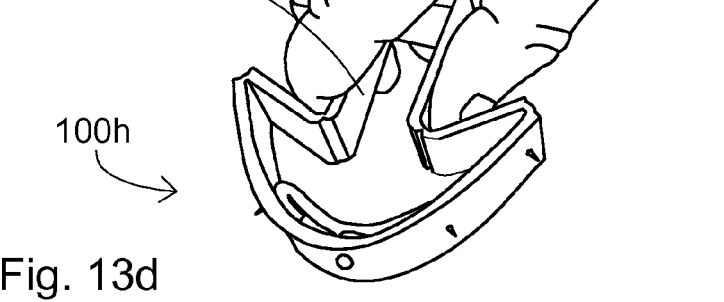
FIG. 13d is an isometric schematic illustration of an illustrative, exemplary eighth embodiment of a utility corner shelf bracket, at a stage prior to installation, according to the present invention.

FIG. 13*d* is an isometric schematic illustration of an illustrative, exemplary eighth embodiment of a utility corner shelf bracket 100*h*, at a stage prior to installation, according to the present invention. A second bow extender 11*d* is disposed on the end of each first bow wing, a pressing handle 36 is disposed on the end of each second bow extender 11*d*, and as an additional option, a first bow extender 11*c* is disposed on the end of each pressing handle 36.

The user presses both pressing handles 36, and so prepares the eighth embodiment of the utility corner shelf bracket 100*h* for mounting on a wall corner.

Figure 14:
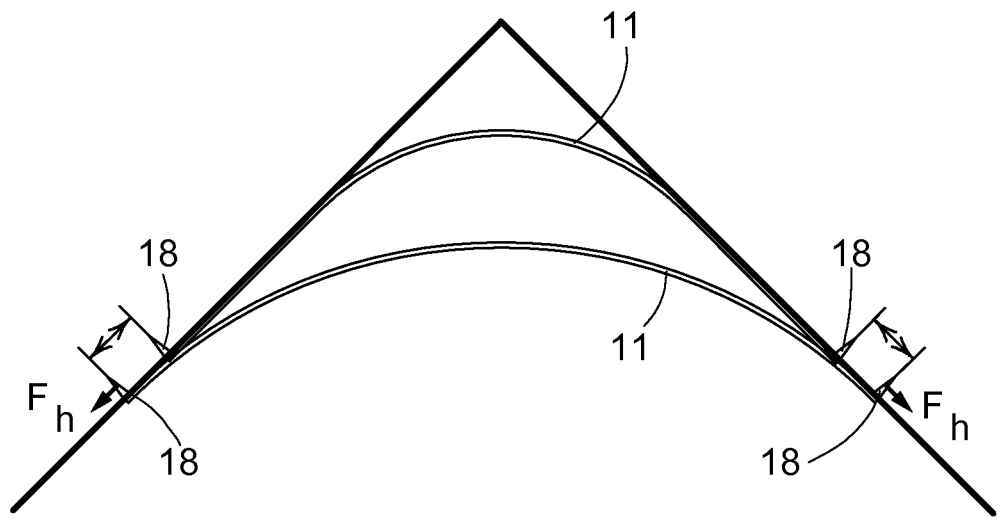
FIG. 14 is a top schematic illustration of a part of an embodiment of a utility corner shelf bracket, in a corner wall, in two modes, according to the present invention.

FIG. 14 is a top schematic illustration of a part of an embodiment of a utility corner shelf bracket, in a corner wall, in two modes, according to the present invention.

The present illustration demonstrates how the elasticity of the first bow 11 generates horizontal forces $F_h$ by means of nails 18.

As noted, the illustration shows two modes, in the first the arc radius of the first bow 11 is smaller than that of the second mode. When preparing a utility corner shelf bracket for mounting in a wall corner, an arc with a smaller radius is formed, and afterward the elasticity of the first bow 11 causes this radius to grow. When the nails 18 are inserted into the walls, the radius growth is stopped. As shown in the illustration, the distance of nail 18 from the wall corner depends on the radius. The growth of the radius is stopped by means of the force applied by the wall on the nails 18, which equals the force on the horizontal plane, in the case shown in the present illustration, applied by nail 18 on the wall, marked here as $F_h$.

Figure 15:
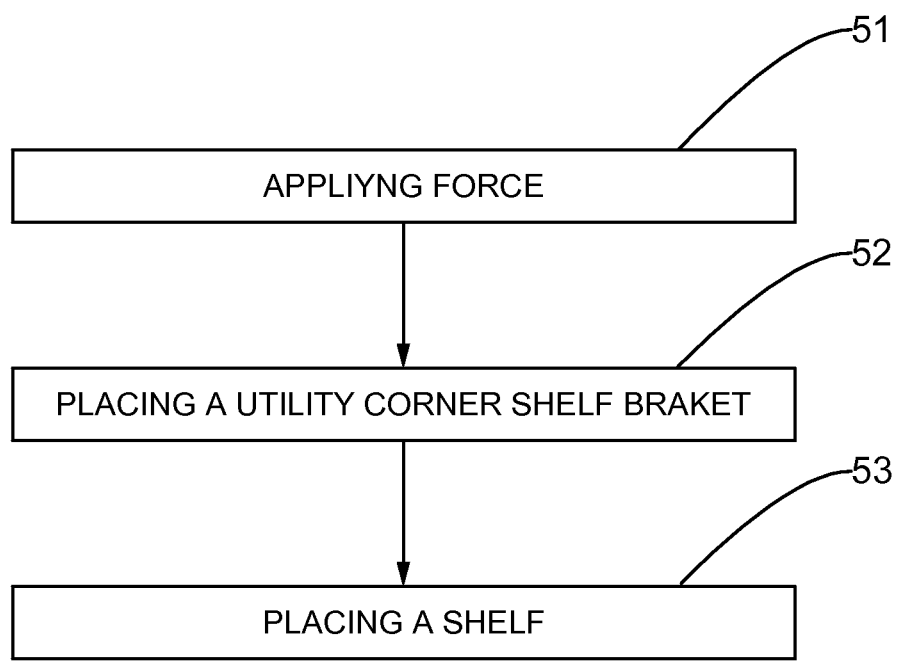
FIG. 15 is a flow chart that schematically illustrates the stages of a method for installing a utility corner shelf bracket and a shelf at a corner wall, according to the present invention.

FIG. 15 is a flow chart that schematically illustrates the stages of a method for installing a utility corner shelf bracket and a shelf at a corner wall, according to the present invention.

The method includes the stages:

applying force on both of first bow wings of a utility corner shelf bracket, which reduces the angle between both of said first bow wings;

placing said utility corner shelf bracket at a desired location, near said corner wall; and placing a shelf upon said utility corner shelf bracket. These stages are marked in the present illustration as 51, 52, and 53 respectively. Instead of or in addition to stage 53, a load can be hung on the utility corner shelf bracket.

The applying force on both of the first bow wings is performed for each embodiment of the present invention according to its structure, namely by pressure of the fingers on both of the first bow wings or any other structural part of the utility corner shelf bracket, or by transmitting force through the rotation of the turnbuckle sleeve or a screw.

Figure 16A:
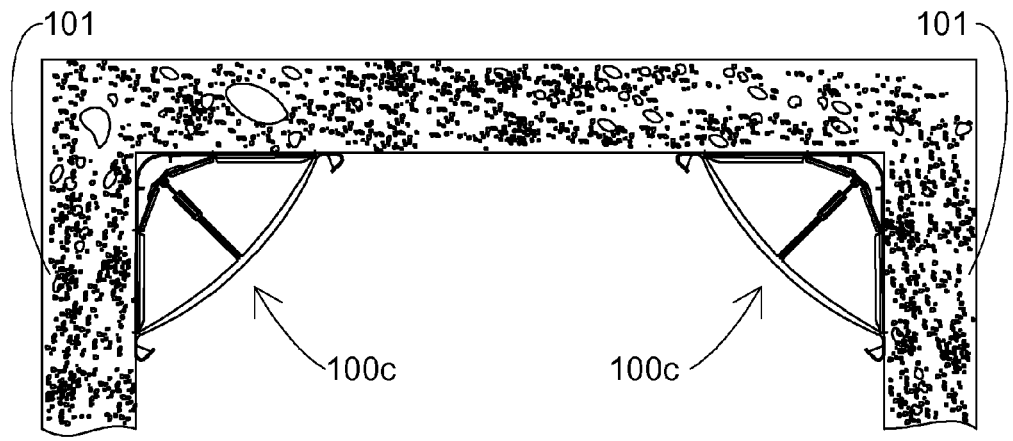
FIGS. 16a-16c are top view schematic illustrations of stages of assembling niche shelf between two corner walls, according to the present invention.
Figure 16B:
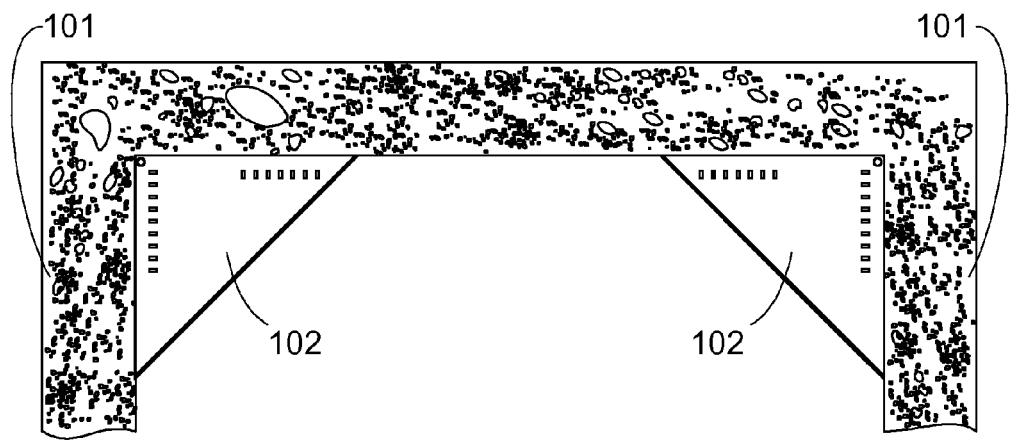
Figure 16C:
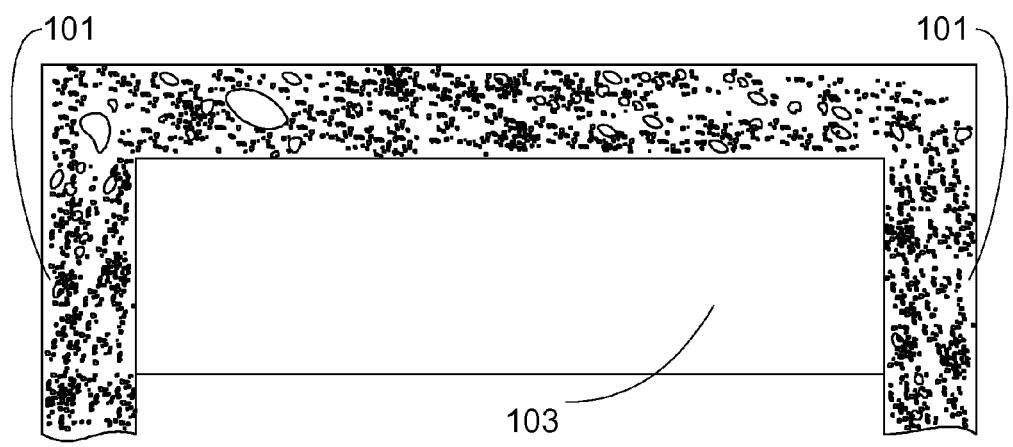

FIGS. 16a-16c are top view schematic illustrations of stages of assembling niche shelf 103 between two corner walls 101, according to the present invention.

FIG. 16a shows two utility corner shelf brackets 100c (third embodiment), each one is mounted in a corner wall 101, according to the present invention.

The present invention is not limited in any way to use of a utility corner shelf bracket 100c (third embodiment), for assembly of a niche shelf 103 between two corner walls 101, according to the present invention.

FIG. 16b shows two corner shelves 102, each of which in the present case has a triangular shape, though other shapes are also possible; after each of both has been mounted on a different utility corner shelf bracket (100c) (third embodiment), according to the present invention.

FIG. 16c shows a niche shelf 103 after being placed upon both corner shelves 102, according to the present invention.

FIG. 16d is a top schematic illustration of a corner shelf 102, according to the present invention.

Shelf supports 102a can be disposed upon a shelf wall 102c to support the niche shelf 103.

FIG. 16e is a side view schematic illustration of a corner shelf 102, according to the present invention.

The present illustration also shows shelf supports 102a disposed upon shelf wall 102c.

FIG. 16f is an isometric bottom view schematic illustrations of a niche shelf 103, according to the present invention.

On one side of the niche shelf 103, which, after mounting the shelf will be the bottom side, longitudinal grooves 103a and lateral grooves 103b are etched.

The longitudinal grooves 103a and lateral grooves 103b enable breaking the niche shelf 103 to fit to any given desired dimensions, and furthermore can be engaged with the longitudinal shelf supports 102a and the lateral shelf supports 102b, to prevent niche shelf 103 from sliding out of place.

FIG. 17a is a side view schematic illustration of a corner shelf 102, assembled at a wall ceiling corner 104, according to the present invention.

Vertically positioned corner shelves 102 have shelf holes 102d designated to receive rods, such as a curtain rod 105.

Each corner shelf 102 is mounted on one utility corner shelf bracket, for example, a utility corner shelf bracket (100c) (third embodiment).

FIG. 17b is an isometric view schematic illustration of a curtain carrying device 107, according to the present invention.

The curtain carrying device 107 includes two corner shelves 102 and a curtain rod 105, which can be assembled with a curtain. This enables easily mounting a curtain near a wall and a ceiling.

FIG. 17c is a top view schematic illustration of a curtain carrying device 107, according to the present invention.

The configuration shown in the present invention has two curtain rods 105. This device enables hanging two curtains, and likewise more than two curtains can be hung in a similar manner, by use of more than two curtain rods 105.

Figure 18A:
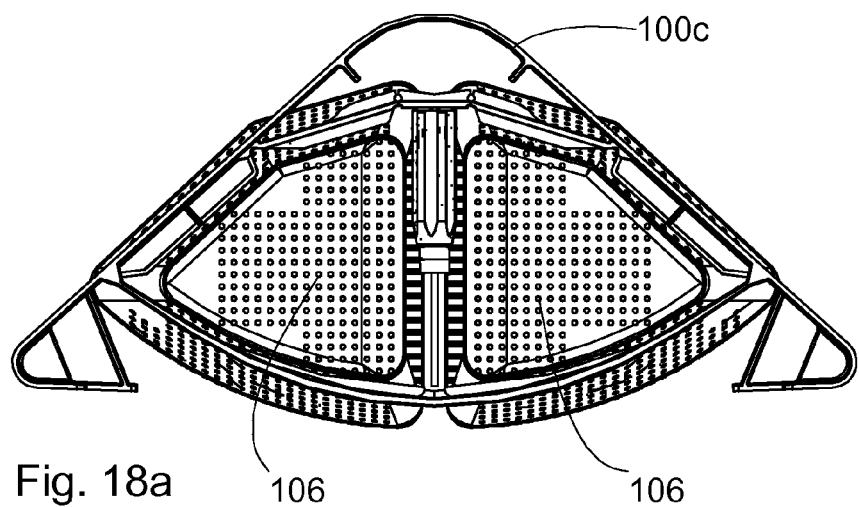
FIG. 18a is a top view schematic illustration of a utility corner shelf bracket (third embodiment), and two baskets, according to the present invention.

FIG. 18a is a top view schematic illustration of a utility corner shelf bracket 100c, (third embodiment), and two baskets 106, according to the present invention.

Basket 106 can be connected to a utility corner shelf bracket 100c (third embodiment), and to another utility corner shelf bracket according to the present invention, by various methods, such as use of screws, hooks, etc.

Baskets 106 can be used to carry various practical items such as fruits, vegetables, etc.

Figure 18B:
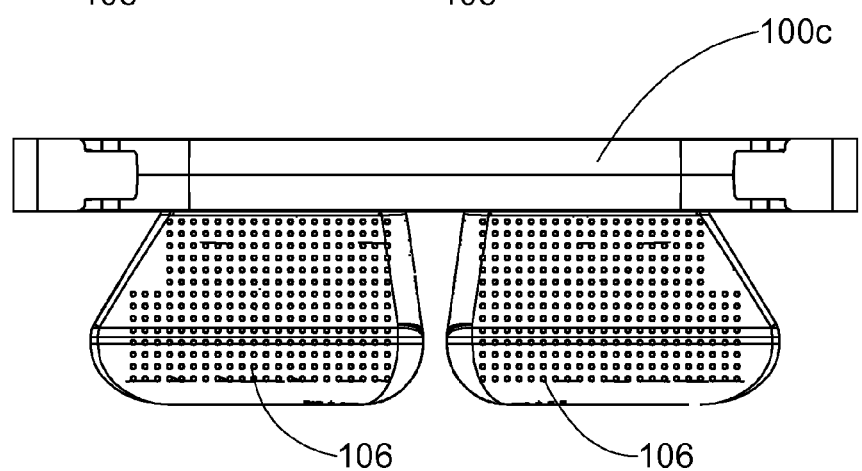
FIG. 18b is a front view schematic illustration of a utility corner shelf bracket (third embodiment), and two baskets, according to the present invention.

FIG. 18b is a front view schematic illustration of a utility corner shelf bracket 100c (third embodiment), and two baskets 106, according to the present invention.

Figure 18C:
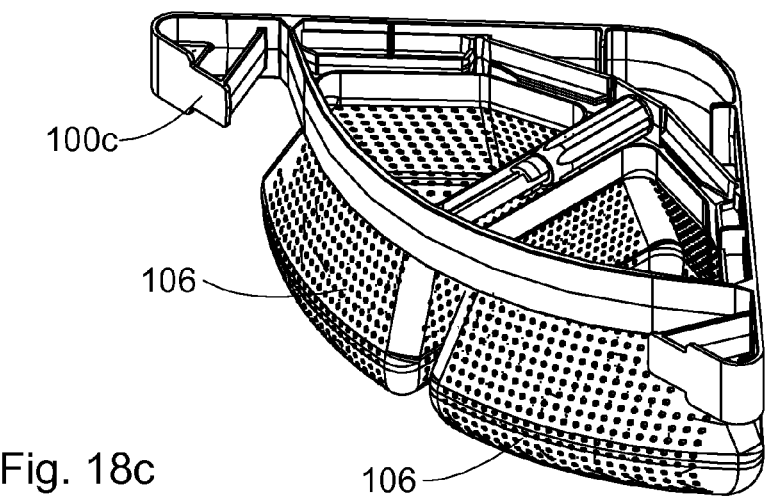
FIG. 18c is an isometric view schematic illustration of a utility corner shelf bracket, (third embodiment), and two baskets, according to the present invention.

FIG. 18c is an isometric view schematic illustration of a utility corner shelf bracket 100c (third embodiment), and two baskets 106, according to the present invention.

While the invention has been described with respect to a limited number of embodiments, it will be appreciated that many variations, modifications and other applications of the invention may be made.

What is claimed is:

1. A utility corner shelf bracket comprising:
    (a) a first bow, said first bow including:
        (i) two first bow wings;
        (ii) a first bow arc, wherein each one of said first bow wings is operatively connected to said first bow arc;
    (b) at least one nail operatively connected to each one of said first bow wings;
    (c) a second bow operatively connected to said first bow;
    (d) a pulling assembly, having a length, operatively connected to said second bow, wherein an operation of said pulling assembly creates a pulling force on said second bow, and wherein said second bow applies force to said two first bow wings,
    wherein said pulling assembly includes:
        (i) a turnbuckle sleeve;
        (ii) a central rod, having two ends, wherein one of said ends of said central rod is disposed on said second bow, and wherein one of said ends of said central rod is engaged with said turnbuckle sleeve; and
        (iii) a screwing rod having two ends wherein one end of said screwing rod is engaged with said turnbuckle sleeve;
    (e) a T rod disposed on said screwing rod; and
    (f) two side rods wherein each one of said side rods is disposed on said T rod, and wherein a rotation of said turnbuckle sleeve changes said length of said pulling assembly.

2. The utility corner shelf bracket of claim 1, further comprising:
    (g) two first bow extender, each one of said two first bow extenders, is disposed on said first bow; and
    (h) two strengthening ribs each one of said two strengthening ribs is disposed on is disposed on different one of said first bow wings.

3. The utility corner shelf bracket of claim 2 further comprising:
    (i) at least one basket, wherein said at least one basket is disposed on said utility corner shelf bracket.

* * * * *